United States Patent
Takahashi

(10) Patent No.: US 10,350,689 B2
(45) Date of Patent: Jul. 16, 2019

(54) DOUBLE-SIDED CIRCULAR CUTTING INSERT AND INDEXABLE ROTARY CUTTING TOOL

(71) Applicant: Mitsubishi Hitachi Tool Engineering, Ltd., Tokyo (JP)

(72) Inventor: Hayato Takahashi, Narita (JP)

(73) Assignee: Mitsubishi Hitachi Tool Engineering, Ltd., Tokyo (JP)

( * ) Notice: Subject to any disclaimer, the term of this patent is extended or adjusted under 35 U.S.C. 154(b) by 36 days.

(21) Appl. No.: 15/578,442

(22) PCT Filed: Jun. 13, 2016

(86) PCT No.: PCT/JP2016/067537
§ 371 (c)(1),
(2) Date: Nov. 30, 2017

(87) PCT Pub. No.: WO2017/002596
PCT Pub. Date: Jan. 5, 2017

(65) Prior Publication Data
US 2018/0147642 A1    May 31, 2018

(30) Foreign Application Priority Data
Jun. 29, 2015 (JP) .................. 2015-129520

(51) Int. Cl.
*B23C 5/06* (2006.01)
*B23C 5/22* (2006.01)

(52) U.S. Cl.
CPC .............. *B23C 5/2213* (2013.01); *B23C 5/06* (2013.01); *B23C 5/2221* (2013.01);
(Continued)

(58) Field of Classification Search
CPC .......... B23C 2200/12; B23C 2200/045; B23C 2200/0422; B23C 2200/0427;
(Continued)

(56) References Cited

U.S. PATENT DOCUMENTS 6,164,878 A * 12/2000 Satran ................... B23C 5/2221
                                                      407/113
6,607,335 B2 * 8/2003 Morgulis ............... B23C 5/202
                                                     407/114

(Continued)

FOREIGN PATENT DOCUMENTS

CN      1187785 A     7/1998
CN    102427905 A     4/2012
(Continued)

OTHER PUBLICATIONS

International Search Report dated Jul. 19, 2016, issued for PCT/JP2016/067537 and English translation thereof.
(Continued)

*Primary Examiner* — Willmon Fridie, Jr.
(74) *Attorney, Agent, or Firm* — Locke Lord LLP

(57) ABSTRACT

In a circular cutting insert of the present invention, the upper side surface and the lower side surface each include: a plurality of planar restraining faces which are disposed sequentially in a circumferential direction of the upper side surface and the lower side surface so as to interpose a joint portion between each of the planar restraining faces and each have a side disposed on the side surface-intermediate line (N); and a plurality of antivibration restraining faces which are each disposed between two planar restraining faces adjacent through the joint portion and each include an inclined face, and the restraining faces of the lower side surface are disposed so as to be shifted with respect to the restraining faces of the upper side surface by a predeter-
(Continued)

mined angle (α) around a central axis of a screw insertion hole.

18 Claims, 12 Drawing Sheets

(52) U.S. Cl.
CPC .. *B23C 2200/045* (2013.01); *B23C 2200/125* (2013.01); *B23C 2200/128* (2013.01); *B23C 2200/361* (2013.01); *B23C 2210/165* (2013.01); *B23C 2210/168* (2013.01); *B23C 2210/244* (2013.01)

(58) Field of Classification Search
CPC ........ B23C 2200/123; B23C 2200/125; B23C 2200/126; B23C 2200/128; B23C 2200/168; B23C 2210/168; B23C 2210/244

See application file for complete search history.

(56) References Cited

U.S. PATENT DOCUMENTS

| | | | |
|---|---|---|---|
| 6,796,750 B2 * | 9/2004 | Men | B23C 5/2221 407/102 |
| 9,144,848 B2 * | 9/2015 | Konta | B23C 5/109 |
| 9,289,834 B2 * | 3/2016 | Park | B23C 5/06 |
| 9,475,134 B2 * | 10/2016 | Satran | B23C 5/207 |
| 9,550,239 B2 * | 1/2017 | Yamamoto | B23C 5/202 |
| 9,573,203 B2 * | 2/2017 | Sunnvius | B23C 5/207 |
| 10,010,950 B2 * | 7/2018 | Matsumura | B23C 5/207 |
| 10,112,241 B2 * | 10/2018 | Lee | B23C 5/207 |
| 10,183,333 B2 * | 1/2019 | Hecht | B23B 27/1622 |
| 2010/0054873 A1 * | 3/2010 | Men | B23C 5/202 407/42 |
| 2011/0305535 A1 * | 12/2011 | Jansson | B23C 5/06 407/103 |
| 2013/0195567 A1 | 8/2013 | Sunnvius et al. | |
| 2013/0336732 A1 * | 12/2013 | Jansson | B23C 5/06 407/47 |
| 2014/0178135 A1 | 6/2014 | Yamamoto | |

FOREIGN PATENT DOCUMENTS

| | | |
|---|---|---|
| JP | 2002-527251 A | 8/2002 |
| JP | 2002-542952 A | 12/2002 |
| JP | 2008-018515 A | 1/2008 |
| JP | 2011-245585 A | 12/2011 |
| JP | 2012-206249 A | 10/2012 |
| JP | 2012-525268 A | 10/2012 |
| JP | 2013-154466 A | 8/2013 |
| WO | 97/00750 A1 | 1/1997 |
| WO | 00/23218 A1 | 4/2000 |
| WO | 00/66305 A1 | 11/2000 |
| WO | 2010/134700 A2 | 11/2010 |
| WO | 2013/002341 A1 | 1/2013 |
| WO | 2013/037475 A1 | 3/2013 |

OTHER PUBLICATIONS

Office Action dated Sep. 6, 2018, issued for the Chinese patent application No. 201680037643.0 and a partial translation of search report.

* cited by examiner

US 10,350,689 B2

DOUBLE-SIDED CIRCULAR CUTTING INSERT AND INDEXABLE ROTARY CUTTING TOOL

TECHNICAL FIELD

The present invention relates to a cutting insert which is detachably attached to an indexable rotary cutting tool for performing milling and an indexable rotary cutting tool to which the cutting insert is attached, and particularly, to a double-sided circular cutting insert and an indexable rotary cutting tool having a means of preventing occurrence of vibrations during a cutting operation of a workpiece.

Priority is claimed on Japanese Patent Application No. 2015-129520, filed on Jun. 29, 2015, the content of which is incorporated herein by reference.

BACKGROUND ART

In a cutting insert formed into a circular shape in a planar view, that is, in a so-called a circular (round) cutting insert, a top surface as a rake face and a bottom surface formed at a position opposite to the top surface are formed into circular shapes, a side surface connecting the top surface and the bottom surface to each other is formed into an approximately columnar shape or an approximately conical shape, and cutting edges are provided in some or all of ridgeline at which the side surface intersects with the top surface. In addition, in a double-sided cutting insert formed in a circular shape, cutting edges are also provided on ridgeline at which the bottom surface and the side surface intersect with each other.

In a case where the cutting insert formed into a circular shape (hereinafter, referred to as a "circular cutting insert") is attached to an insert mounting seat provided on a tool main body of the indexable rotary cutting tool and is fixed to the insert mounting seat by tightening a clamp screw, and a cutting operation of a workpiece is performed, there are the following tasks (1) to (3), and in the related art, solutions with respect to the tasks are suggested.

Task (1)

In the circular cutting insert, cutting edges formed into a circular shape are provided on the ridgeline at which the top surface intersects with the side surface or the ridgelines at which the top surface and the bottom surface intersect with the side surface, and thus, it is necessary to effectively use the regions of the cutting edges. Accordingly, whenever the circular cutting insert is reattached to the insert mounting seat of the tool main body, it is necessary to accurately position the circular cutting insert so as to fix the circular cutting insert to the tool main body by tightening the clamp screw (an indexing function is required). Particularly, when a portion (cutting edge portion) of the cutting edges used during the cutting operation wears out, in order to use an unused portion during the cutting operation the next time, the circular cutting insert is rotated about a center of a circle of the cutting edges by a predetermined angle. Accordingly, in a state where the positions of the cutting edges are shifted, the circular cutting insert is reattached to the insert mounting seat. In the reattachment of the cutting edges, it is necessary to attach the circular cutting insert to the insert mounting seat in a state where the unused cutting edges are accurately positioned without erroneous operations.

Task (2)

Even when the circular cutting insert is firmly fixed to the insert mounting seat, the cutting insert is easily displaced by a cutting force loaded to the cutting insert during a cutting operation of a workpiece. The reason for this is that the circular cutting insert is fixed to the insert mounting seat of the tool main body by tightening the clamp screw; however, the side surface of the circular cutting insert is formed into a columnar shape (cylindrical shape) or a conical shape, and thus, a reaction force with respect to the cutting force during the cutting operation acts as a force trying to rotate the circular cutting insert about the clamp screw (a turning force about the clamp screw). If the circular cutting insert fixed to the insert mounting seat is rotated by the turning force (rotational moment) and the fixed position thereof is slightly shifted, machining accuracy of a machined surface of the workpiece deteriorates, vibrations are generated, abnormal wear of the cutting edges occurs, and thus, the cutting edges are damaged. Accordingly, in the indexable rotary cutting tool to which the circular cutting insert is attached, a function for preventing turning (or rotation) of the circular cutting insert during the cutting operation (antirotation function) is required.

Task (3)

In general, when a workpiece is cut using the indexable rotary cutting tool to which the cutting insert is attached, the cutting force acting on the cutting insert is applied in a direction of pressing the cutting edge portion (a portion of the cutting edge used for cutting) from the top surface to the insert mounting seat of the indexable rotary cutting tool. In addition, in the cutting insert, a stress acting on the cutting edge portion and a repulsive force with respect to the stress are generated. During a cutting operation in a normal state, the stress acting on the cutting edge portion and the repulsive force with respect to the stress mainly act on the clamp screw by which the cutting insert is fixed to the tool main body.

However, in a transient state during the cutting operation, if the stress acting on the cutting edge portion and the repulsive force with respect to the stress are not balanced with each other, vibrations may occur. The transient state during the cutting operation indicates a moment when the cutting edge bites into the workpiece, or the like. The clamp screw is loosened or the installation (attachment) position of the cutting insert with respect to the insert mounting seat is displaced by the vibrations, and thus, a so-called displacement of the cutting insert may occur. If the vibrations and the displacement of the cutting insert occur, the cutting edge is damaged, and there are problems that favorable machining accuracy and improved machined surface roughness with respect to the workpiece cannot be obtained. In addition, there is a disadvantage that noise occurs during the cutting operation.

Moreover, in recent years, in order to improve machining efficiency with respect to a workpiece, a high-speed cutting operation is required. If the high-speed cutting operation is performed, when the cutting edge of the cutting insert bites into a workpiece, vibrations are likely to be generated by the impact. Accordingly, in order to realize the high-speed cutting operation in the indexable rotary cutting tool to which the circular cutting insert is attached, it is very important to provide a function for preventing or suppressing occurrence of the vibrations (antivibration function).

In the indexable rotary cutting tool to which the circular cutting insert is attached, among the above-described tasks (1) to (3), an improvement plan for the tasks (1) and (2) are proposed by many patent applications in the related art. However, there are few suggestions with respect to an improvement plan for the task (3) in addition the tasks (1) and (2). The reason for this is that a favorable improvement plan for the tasks (1) and (2) is based on a technical idea that vibrations are not generated during the cutting operation.

For example, the improvement plans for the tasks (1) and 2 are suggested by PTL 1 to PTL 3 below.

PTL 1 (Japanese Unexamined Patent Application, First Publication No. 2011-245585) suggests that in a positive round cutting insert, the cutting insert for increasing reliability of fixing with respect to an insert mounting seat and a cutting tool using the cutting insert. In the invention described in PTL 1, a plurality of planar indexing surfaces of which inclination angles are larger than the inclination angle of a side surface of the cutting insert are provided on the side surface at constant pitches in a circumferential direction, a vertically long protrusion is provided at a center portion of each of the indexing surfaces in the circumferential direction, the protrusion is inserted to engage with a recessed portion provided on a seating side surface (wall surface) of an insert mounting seat of a tool main body, and in this state, the indexing surfaces positioned at different positions abut on a plurality of seating side surfaces. Accordingly, the cutting insert is positioned on the insert mounting seat, and rotation of the cutting insert is prevented. In addition, PTL 1 describes that in the cutting tool, an indexing number of the cutting edges of the cutting insert is set to four, two seating side surfaces whose directions are different from each other by 90 degrees are formed on the insert mounting seat of the tool main body, and the adjacent indexing surfaces of the cutting insert are restrained by two seating site surfaces.

PTL 2 (Published Japanese Translation No. 2012-525268 of the PCT International Publication) suggests a double-sided cutting insert formed into a circular shape and a cutting tool using the cutting insert. The cutting insert described in PTL 2 has a configuration in which a plurality of antirotation surfaces substantially perpendicular to a top surface and a bottom surface are provided in a circumferential direction of a side surface of the cutting insert. Meanwhile, protrusion surfaces which are aligned with the antirotation surface of the cutting insert and prevent the rotation of the cutting insert, are provided on a pocket side surface (a wall surface provided on the insert mounting seat) of the tool main body. Accordingly, a wide attachment area is secured between the cutting insert and the cutting tool to prevent the rotation of the cutting insert.

PTL 3 (Specification of U.S. Pat. No. 6,607,335) suggests an invention which relates to a cutting insert attached to an indexable rotary cutting tool and the cutting tool. The cutting tool described in PTL 3 does not adopt the indexing means and the antirotation means of the cutting insert described in PTLs 1 and 2. That is, the means of restraining the rotation restraining faces formed on the side surface of the cutting insert or the protrusions of the rotation restraining faces, is not provided on a restraining wall surface erected to the seating surface provided on the insert mounting seat of the tool main body. However, FIG. 14 of PTL 3 shows an embodiment of a cutting insert, in which the center of the side surface of the double-sided circular cutting insert is a ridgeline at which the side surface and a base surface (intermediate plane M) of the cutting insert intersect with each other, and the side surface each between the ridgeline and the top surface and between the ridgeline and the bottom surface includes eight planes sequentially connected along the ridgeline to have an octagonal cross-section.

PTL 4 and PTL 5 suggest inventions relating to a cutting tool having a means of preventing occurrence of vibrations in the indexable rotary cutting tool to which the circular cutting insert is attached.

PTL 4 (Japanese Unexamined Patent Application, First Publication No. 2012-206249) suggests an invention relating to a double-sided circular cutting insert for preventing occurrence of vibrations caused by loosening of a tightening screw in an antirotation mechanism which can be easily and inexpensively manufactured. The circular cutting insert suggested in PTL 4 includes a plurality of dimples (recessed portions) formed on the top surface and a plurality of other dimples formed on the bottom surface facing the top surface to be capable of an indexing. The cutting insert is removably accommodated in an insert accommodation pocket of the tool main body, and the insert accommodation pocket includes a single protrusion which can be accommodated in one of the plurality of dimples. Therefore, according to cooperation of the protrusion of the insert accommodation pocket and one of a plurality of dimples of the cutting insert, the indexing of the round cutting insert attached to the insert accommodation pocket can be performed, and the rotation of the cutting insert during the cutting operation is prevented. As the effect thereof, PTL 4 describes that a mechanism for preventing occurrence of vibrations caused by the loosening of the tightening screw is provided.

PTL 5 (Published Japanese Translation No. 2002-527251 of the PCT International Publication) suggests an invention relating to an antirotation attachment mechanism of a circular cutting insert including an antirotation means of the circular cutting insert and an antivibration means thereof. PTL 5 states that the antirotation attachment mechanism includes a plurality of curved stopping surfaces inclined to a cylindrical side surface of the cutting insert around the cylindrical side surface and an antirotation surface which forms an interference fit joint surface engaging with the inclined disposition portion of the curved stopping surface of the cutting insert in one line contact manner on the insert mounting seat (pocket) of the tool main body. In addition, PTL 5 states that the side surface of the pocket includes a semicircular upper portion for coming into direct contact with the upper side wall of the cutting insert.

In addition, Specification of PTL 5 describes that "a supporting contact between an upper portion 60 of a pocket side surface 50 and an upper side wall 64 of an insert 3 is important for two reasons. Firstly, most of lateral vibration loads applied to the insert 3 are absorbed by a wide range of semicircular contact between the side surface 50 of the pocket 5 and the upper portion 60 of the insert side wall 21 during the cutting operation in order to protect the antirotation mechanism 1 from the vibration loads. Secondly, according to this configuration, most of the lateral vibrations concentrate on the strongest portion of the insert 3, that is, the upper side wall 64 which has the largest diameter of the insert and in which a material of an insert main body is little or not removed at all since the curved stopping surfaces 35 are provided". That is, PTL 5 describes that the supporting contact between the upper portion 60 of the pocket side surface 50 and the upper side wall 64 of the insert 3 absorbs lateral vibrations occurring during the cutting operation.

CITATION LIST

Patent Literature

[PTL 1] Japanese Unexamined Patent Application, First Publication No. 2011-245585

[PTL 2] Published Japanese Translation No. 2012-525268 of the PCT International Publication

[PTL 3] U.S. Pat. No. 6,607,335

[PTL 4] Japanese Unexamined Patent Application, First Publication No. 2012-206249

[PTL 5] Published Japanese Translation No. 2002-527251 of the PCT International Publication

SUMMARY OF INVENTION

Technical Problem

With respect to the above-described task of the circular cutting insert, as described in PTL 1, the cutting insert and the cutting tool using the same include the configuration to solve the indexing function (task (1)) and the antirotation function (task (2)). However, in PTL 1, the solution with respect to the antivibration function (task (3)) is not described. In addition, the cutting insert described in PTL 1 does not include the configuration of the double-sided cutting insert in a positive circular cutting insert.

As described in PTL 2, in the double-sided cutting insert formed into a circular shape and the cutting tool using the same, the plurality of antirotation surface substantially perpendicular to the top surface and the bottom surface are provided in the circumferential direction of the side surface of the cutting insert, and the protrusion surface which is aligned with the antirotation surface and prevents the rotation of the cutting insert is provided on the pocket side surface (the wall surface provided on the insert mounting seat) of the tool main body. Accordingly, the indexing function and the antirotation function are provided in the double-sided circular cutting insert. However, similarly to PTL 1, the cutting insert and the cutting tool do not have the antivibration function.

As shown in FIG. 14 of PTL 3, the circular cutting insert includes two side surfaces between the ridgeline and the top surface and between the ridgeline and the bottom surface with respect to the ridgeline portion at which the side surface and the base surface (M) intersect with each other, and each side surface is formed by connecting eight planar side faces sequentially in the direction of the ridgeline and has an octagonal cross-section. In addition, FIG. 14 of PTL 3 shows that the joint portion of the planar side faces adjacent in the direction of the ridgeline forms the corner (corner portion) protruding toward the outside of the cutting insert.

However, in the circular cutting insert described in PTL 3, an insertion hole penetrating from the top surface to the bottom surface is not a hole into which the clamp screw is inserted and which is formed so as to fix the circular cutting insert to the seating surface of the insert mounting seat. In addition, as shown in FIG. 5 of PTL 3, the fixing of the circular cutting insert adopts the means of allowing the tip portion of the clamp screw to engage with a clamp surface formed around the insertion hole of the top surface of the circular cutting insert. Accordingly, the double-sided circular cutting insert described in PTL 3 is not the circular cutting insert having the means of performing indexing and antirotation by attaching the circular cutting insert to the insert mounting seat of the tool main body by tightening the clamp screw inserted into the screw insertion hole. In addition, PTL 3 does not describe that the cutting tool and the cutting insert have an antivibration means.

In the double-sided circular cutting insert described in PTL 4, the plurality of dimples (recessed portions) are formed on the top surface and the bottom surface, and the single protrusion accommodated in one of the plurality of dimples of the top surface and the bottom surface is provided in the insert accommodation pocket of the tool main body. Accordingly, the indexing of the round cutting insert can be performed, the rotation of the cutting insert is prevented during the cutting operation, and as a result, occurrence of vibrations caused by loosening of the tightening screw is prevented. However, the side surface of the round cutting insert is configured in a circular shape (columnar shape), and thus, the side surface does not have a configuration in which the plurality of planar side faces are connected with each other in the circumferential direction.

In the antirotation attachment mechanism of the round cutting insert described in PTL 5, the plurality of curved stopping surfaces are provided around the cylindrical side surface of the cutting insert, and the antirotation surface is provided, which forms the interference fit joint surface engaging with the inclined disposition portion of the curved stopping surface of the cutting insert in one line contact manner on the insert mounting seat (pocket) of the tool main body. Accordingly, the indexing function and the antirotation function are exerted. In addition, the side surface of the pocket includes a semicircular upper portion for coming into direct contact with the upper side wall of the cutting insert, and thus, most of the lateral vibration loads applied to the cutting insert are absorbed.

The indexing function and the antirotation function of the cutting insert described in PTL 5 are exerted by the configuration in which the plurality of curved stopping surfaces are disposed from the intermediate portion of the side surface toward the bottom surface at equal intervals on the side surface formed into a circular shape.

In addition, PTL 5 describes that vibrations are absorbed by the configuration including the semicircular upper portion for causing the side surface of the pocket to come into direct contact with the upper side wall of the cutting insert. However, the cutting insert and the pocket described in PTL 5 have room for improvement.

Accordingly, in the circular cutting insert and the indexable rotary cutting tool to which the cutting insert is attached, an object of the present invention is to provide a double-sided circular cutting insert having a means of increasing indexing accuracy of the cutting insert with respect to a tool main body, preventing the rotation of the cutting insert during a cutting operation, and preventing occurrence of vibrations, and an indexable rotary cutting tool to which the cutting insert is detachably attached.

Solution to Problem

The present invention includes the following aspects.

(1) A double-sided circular cutting insert including: a top surface and a bottom surface configured to be detachably attached to an insert mounting seat and formed into a circular shape in a planar view of the circular cutting insert; a side surface connecting the top surface and the bottom surface; a screw insertion hole penetrating from the top surface to the bottom surface; and cutting edges formed on intersecting ridgelines at which the top surface and the bottom surface intersect with the side surface, in which when a plane bisecting the circular cutting insert in a thickness direction is referred to as an intermediate plane (M) of the circular cutting insert, an imaginary ridgeline at which the intermediate plane (M) intersects with the side surface is referred to as a side surface-intermediate line (N), the side surface between the side surface-intermediate line (N) and the top surface is referred to as an upper side surface, and the side surface between the side surface-intermediate line (N) and the bottom surface is referred to as a lower side surface, the upper side surface and the lower side surface each include:

a plurality of planar restraining faces disposed sequentially in a circumferential direction of the upper side surface and the lower side surface so as to interpose a joint portion between each of the planar restraining faces, each planar restraining face having a side disposed on the side surface-intermediate line (N), and a plurality of antivibration restraining faces, each antivibration restraining face being disposed between two planar restraining faces adjacent through the joint portion, and comprising an inclined face which has an apex portion at an end portion of each of the joint portions closer to the side surface-intermediate line (N) and a side disposed on the side surface-intermediate line (N) and tilts from the apex portion to the side so as to have a length in the circumferential direction of the side surface gradually increasing from the apex portion to the side surface-intermediate line (N), the planar restraining faces and the antivibration restraining faces of the lower side surface are disposed so as to be shifted with respect to the planar restraining faces and the antivibration restraining faces of the upper side surface by a predetermined angle ($\alpha$) around a central axis of the screw insertion hole, and the planar restraining faces and the antivibration restraining faces of the upper side surface and the lower side surface are configured to be restrained by a restraining wall surface provided on the insert mounting seat when the circular cutting insert is attached to an indexable rotary cutting tool.

(2) The double-sided circular cutting insert described in the above (1), wherein the side of each of the planar restraining faces of the upper side surface disposed on the side surface-intermediate line (N) is also the side of each of the antivibration restraining faces of the lower side surface disposed on the side surface-intermediate line (N), and the side of each of the planar restraining faces of the lower side surface disposed on the side surface-intermediate line (N) is also the side of each of the antivibration restraining faces of the upper side surface disposed on the side surface-intermediate line (N).

(3) The double-sided circular cutting insert described in the above (1) or (2), wherein the sides of the planar restraining faces disposed on the side surface-intermediate line (N) and the sides of the antivibration restraining faces disposed on the side surface-intermediate line (N) have the same length and are alternately connected with each other along the side surface-intermediate line (N).

(4) The double-sided circular cutting insert described in any one of the above (1) to (3), wherein each of the joint portions has a predetermined width in the circumferential direction of the side surface, and each of the antivibration restraining faces is formed into an isosceles trapezoid when the circular cutting insert is viewed from the side surface, and the isosceles trapezoid has an upper base which is the apex portion of each of the joint portions, and a lower base which is the side disposed on the side surface-intermediate line (N).

(5) The double-sided circular cutting insert described in any one of the above (1) to (3), wherein each of the joint portions comprises a joint ridgeline which is a ridgeline formed by sides of two adjacent planar restraining faces which face each other, and each of the antivibration restraining faces is formed into an isosceles triangle or an equilateral triangle when the circular cutting insert is viewed from the side surface, the isosceles triangle and the equilateral triangle have an apex which is an end of the joint ridgeline closer to the side surface-intermediate line (N), and a base corresponding to the apex which is the side disposed on the side surface-intermediate line (N).

(6) The double-sided circular cutting insert described in any one of the above (1) to (5), wherein in a longitudinal section of the circular cutting insert passing through a central axis of the screw insertion hole, a ridgeline of each of the antivibration restraining faces is linear, convex, or concave.

(7) The double-sided circular cutting insert described in any one of the above (1) to (6), wherein each of the joint portion and each of regions in the adjacent two planar restraining faces in a predetermined range from the joint portion in the circumferential direction of the side surface are formed into an antirotation surface as a corner portion, and the antirotation surface is configured to be restrained by the restraining wall surface provided on the insert mounting seat as a means of preventing the circular cutting insert from rotation when the circular cutting insert is attached to an indexable rotary cutting tool.

(8) The double-sided circular cutting insert described in any one of the above (1) to (7), wherein an outline of a cross-section of the circular cutting insert along the intermediate plane (M) is formed into a regular polygon.

(9) The double-sided circular cutting insert described in any one of the above (1) to (8), wherein the upper side surface and the lower side surface each comprise: the eight planar restraining faces, the eight antivibration restraining faces, and the eight antirotation surfaces;

and the angle ($\alpha$) is set to be 22.5 degrees.

(10) The double-sided circular cutting insert described in any one of the above (1) to (8), wherein the upper side surface and the lower side surface each comprise: the six planar restraining faces, the six antivibration restraining faces, and the six antirotation surfaces; and the angle ($\alpha$) is set to be 30 degrees.

(11) An indexable rotary cutting tool including: a tool main body which includes an insert mounting seat; and the double-sided circular cutting insert according to any one of claims 1 to 10 which is detachably attached to a seating surface provided on the insert mounting seat by tightening a clamp screw, wherein the insert mounting seat includes a restraining wall surface for restraining the side surface of the circular cutting insert, the restraining wall surface erecting on the seating surface, and wherein the restraining wall surface includes:

a first restraining wall provided with an antirotation wall surface configured to restrain one of the antirotation surfaces formed on the upper side surface of the circular cutting insert, and a planar restraining wall surface configured to restrain one of the planar restraining faces disposed on the lower side surface at a position corresponding to the restrained antirotation surface, and a second restraining wall provided with a planar restraining wall surface configured to restrain one of the planar restraining faces formed on the upper side surface of the circular cutting insert, and an antivibration wall surface configured to restrain one of the antivibration restraining faces disposed on the lower side surface at a position corresponding to the restrained planar restraining face.

(12) The indexable rotary cutting tool described in the above (11), wherein the antirotation wall surface and the planar restraining wall surface of the first restraining wall are formed such that the antirotation wall surface is disposed at a more distant position from the seating surface than the planar restraining wall surface.

(13) The indexable rotary cutting tool described in the above (11) or (12), wherein the planar restraining wall surface and the antivibration wall surface of the second restraining wall are formed such that the antivibration wall surface is disposed at a closer position from the seating surface than the planar restraining wall surface.

(14) The indexable rotary cutting tool described in any one of the above (11) to (13), wherein the antirotation wall surface includes a wall surface formed into a concave shape and configured to engage with the antirotation surface of the circular cutting insert.

(15) The indexable rotary cutting tool described in any one of the above (11) to (14), wherein the antivibration wall surface includes a wall surface formed into a shape corresponding to the antivibration restraining face of the circular cutting insert and configured to contact with the antivibration restraining face.

(16) The indexable rotary cutting tool described in any one of the above (11) to (15), wherein the double-sided circular cutting insert of which the upper side surface and the lower side surface each include the eight planar restraining faces, the eight antivibration restraining faces, and the eight antirotation surfaces is attached to the insert mounting seat, and the first restraining wall and the second restraining wall are formed so as to intersect with each other at an intersecting angle of 67.5 degrees.

(17) The indexable rotary cutting tool described in any one of the above (11) to (15), wherein the double-sided circular cutting insert of which the upper side surface and the lower side surface each include the six planar restraining faces, the six antivibration restraining faces, and the six antirotation surfaces is attached to the insert mounting seat, and the first restraining wall and the second restraining wall are formed so as to intersect with each other at an intersecting angle of 60 degrees.

(18) A double-sided circular cutting insert including: a top surface and a bottom surface configured to be detachably attached to an insert mounting seat and formed into a circular shape in a planar view of the circular cutting insert; a side surface connecting the top surface and the bottom surface; a screw insertion hole penetrating from the top surface to the bottom surface; and cutting edges formed on intersecting ridgelines at which the top surface and the bottom surface intersect with the side surface, in which when a plane bisecting the circular cutting insert in a thickness direction is referred to as an intermediate plane (M) of the circular cutting insert, an imaginary ridgeline at which the intermediate plane (M) intersects with the side surface is referred to as a side surface-intermediate line (N), the side surface between the side surface-intermediate line (N) and the top surface is referred to as an upper side surface, and the side surface between the side surface-intermediate line (N) and the bottom surface is referred to as a lower side surface, the upper side surface and the lower side surface each include:

a plurality of planar restraining faces disposed sequentially in a circumferential direction of the upper side surface and the lower side surface so as to interpose a joint portion between each of the planar restraining faces, each planar restraining face having a side disposed on the side surface-intermediate line (N), and a plurality of antivibration restraining faces, each antivibration restraining face being disposed between two planar restraining faces adjacent through the joint portion, and comprising an inclined face which has an apex portion at an end portion of each of the joint portions closer to the side surface-intermediate line (N) and a side disposed on the side surface-intermediate line (N) and tilts from the apex portion to the side so as to have a length in the circumferential direction of the side surface gradually increasing from the apex portion to the side surface-intermediate line (N), and the planar restraining faces and the antivibration restraining faces of the lower side surface are disposed so as to be shifted with respect to the planar restraining faces and the antivibration restraining faces of the upper side surface by a predetermined angle ($\alpha$) around a central axis of the screw insertion hole.

In addition, the circular cutting insert described in (18) may include additional aspects described in any one of the above (2) to (10).

Advantageous Effects of Invention

In the present invention, the first restraining wall and the second restraining wall are provided on the insert mounting seat of the tool main body of the indexable rotary cutting tool, a stage is provided at a position of the first restraining wall separated from the seating surface in a direction perpendicular to the seating surface, and the planar restraining wall surface and the antirotation wall surface are provided at the position at which the stage is provided. Similarly, the stage is provided at a position of the second restraining wall separated from the seating surface in the direction perpendicular to the seating surface, and the antivibration wall surface and the planar restraining wall surface are provided at the position at which the stage is provided. Meanwhile, in the circular cutting insert, the plurality of antivibration restraining faces, planar restraining faces, and antirotation surfaces (corners) are provided in each of the upper side surface and the lower side surface of the side surface. In addition, when the circular cutting insert is attached to the insert mounting seat, one of the antivibration restraining faces of the circular cutting insert comes into surface contact with and engages with the antivibration wall surface of the second restraining wall. Accordingly, the present invention can have the following effects.

(1) When a cutting operation of a workpiece is performed using the indexable rotary cutting tool, in cutting forces applied to the cutting edge of the circular cutting insert, a component force in a circumferential tangential direction of a rotation trajectory of the cutting edge of the cutting tool is transmitted to the antivibration restraining faces of the circular cutting insert and strongly presses the antivibration restraining faces to the antivibration wall surface of the insert mounting seat. According to this pressing action, the antivibration wall surface of the tool main body receives the component force of the cutting forces, and thus, occurrence of vibrations is prevented or suppressed while a restraining force generated by the surface-contact and engagement between the antivibration wall surface and one of the antivibration restraining faces of the circular cutting insert is maintained. Therefore, it is possible to provide the circular cutting insert capable of preventing or suppressing occurrence of vibrations and the indexable rotary cutting tool to which the cutting insert is attached.

(2) When an indexing operation of attaching the circular cutting insert to the insert mounting seat is performed, the planar restraining wall surface of the first restraining wall engages with the planar restraining face formed on the lower side surface of the side surface of the circular cutting insert, and the planar restraining wall surface of the second restraining wall engages with the planar restraining face formed on the upper side surface of the side surface of the circular cutting insert. Accordingly, it is possible to attach the circular cutting insert to the insert mounting seat without erroneous operations.

Moreover, the recessed portion of the antirotation wall surface provided on the first restraining wall engages with the corner of the side surface of the circular cutting insert, and thus, it is possible to prevent the circular cutting insert from rotating during the cutting operation.

(3) According to the above (1) and (2), in the present invention, in the cutting operation using the indexable rotary cutting tool to which the double-sided circular cutting insert is attached, it is possible to improve surface accuracy of a machined surface of a workpiece and it is possible to remarkably improve a tool life.

DESCRIPTION OF EMBODIMENTS (First Embodiment of Circular Cutting Insert)

Figure 1:
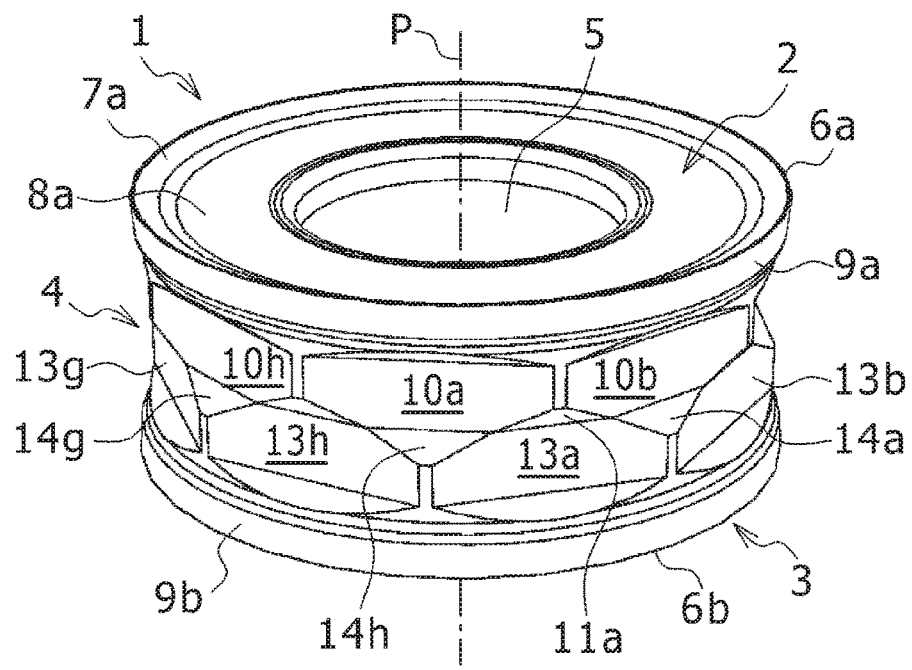
FIG. 1 is a perspective view showing a first embodiment of a circular cutting insert of the present invention.

An embodiment of a double-sided circular cutting insert of the present invention will be described with reference to the drawings. FIG. 1 is a perspective view showing a first embodiment of the circular cutting insert of the present invention and FIG. 2 is a side view of the circular cutting insert 1 shown in FIG. 1.

Figure 2:
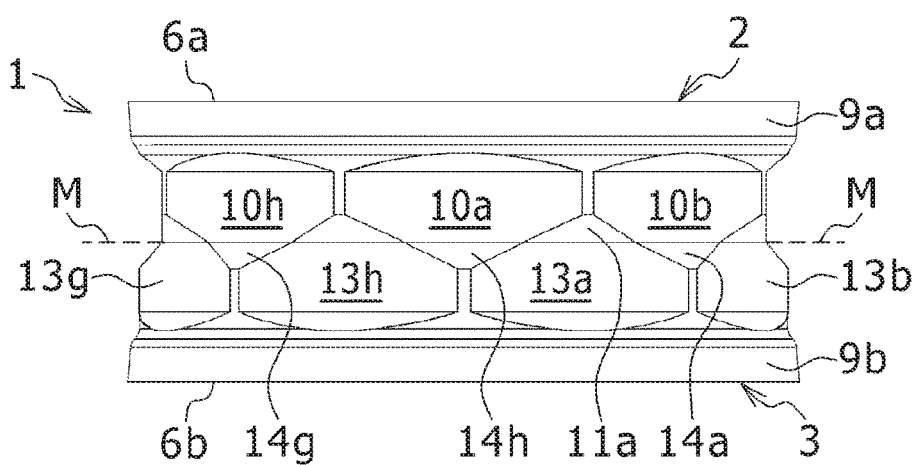
FIG. 2 is a side view of the circular cutting insert shown in FIG. 1.

As shown in FIGS. 1 and 2, a basic configuration of the circular cutting insert 1 of the present embodiment includes: a top surface 2 formed into a circular shape in a planar view; a bottom surface 3 disposed at a position opposite to the top surface 2 and formed into a circular shape in a planar view; a side surface 4 connecting the top surface 2 and the bottom surface 3 to each other; a screw insertion hole 5 penetrating from the top surface 2 to the bottom surface 3; and cutting edges 6*a* and 6*b* formed along circular intersecting ridgelines at which the top surface 2 and the bottom surface 3 intersect with the side surface 4 and formed into circular shapes. In this way, the circular cutting insert 1 is a double-sided circular cutting insert which can use the cutting edge 6*a* and the cutting edge 6*b* provided on the top surface 2 and the bottom surface 3. A reference numeral P shown in FIG. 1 is a central axis of the screw insertion hole 5. The top surface 2 and the bottom surface 3 are formed into a circle centered on the central axis P of the screw insertion hole 5 in a planar view. In the descriptions below, the double-sided circular cutting insert 1 of the present embodiment may be simply referred to as a "cutting insert 1".

The top surface 2 includes: a rake face 7*a* which is an inclined face inclined downwardly (inclined in a direction approaching the bottom surface 3) toward the screw insertion hole 5 from the cutting edge 6*a* formed into a circular shape; and a top surface flat portion 8*a* formed from the rake face 7*a* to an opening of the screw insertion hole 5. Each of the rake face 7*a* and the top surface flat portion 8*a* is an annular surface centered on the central axis P of the screw insertion hole 5. The cutting insert 1 is a double-sided cutting insert, and thus, the shape and the configuration of the bottom surface 3 are the same as those of the top surface 2. That is, the bottom surface 3 includes: a rake face 7*b* which is an inclined face inclined downwardly (inclined in a direction approaching the top surface 2) toward the screw insertion hole 5 from the cutting edge 6b; and a bottom surface flat portion 8b which is formed from the rake face 7b to the opening of the screw insertion hole 5 (refer to FIG. 7). The top surface flat portion 8a and the bottom surface flat portion 8b are formed to be parallel to each other and are planes which are orthogonal to the central axis P of the screw insertion hole 5.

Here, as shown in FIG. 2, a plane bisecting the double-sided circular cutting insert 1 in a thickness direction thereof is defined as an "intermediate plane (M)" of the cutting insert. The thickness direction of the cutting insert 1 indicates a direction in which the central axis P of the screw insertion hole 5 extends, and the intermediate plane (M) is a plane which is orthogonal to the central axis P. In the thickness direction, a direction from the top surface 2 or the bottom surface 3 toward the intermediate plane (M) is referred to as the inside in the thickness direction, and a direction from the intermediate plane (M) toward the top surface 2 or the bottom surface 3 is referred to as the outside in the thickness direction. In addition, a direction around the central axis P is referred to as a circumferential direction, and a direction orthogonal to the central axis P is referred to as a radial direction. In the radial direction, a direction approaching the central axis P is referred to as the inside in the radial direction, and a direction separated from the central axis P is referred to as the outside in the radial direction.

Figure 3:
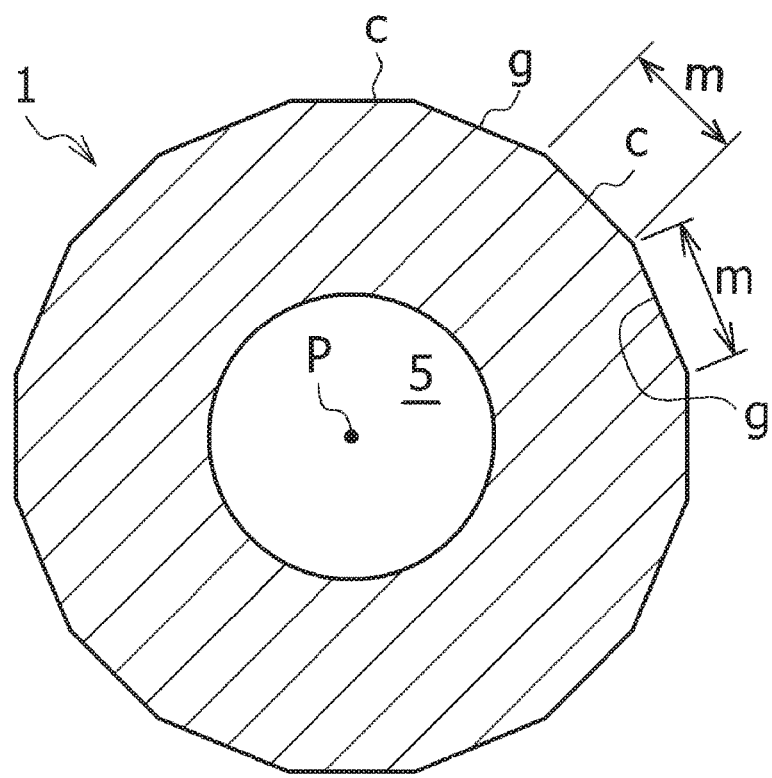
FIG. 3 is a sectional view taken along an intermediate plane (M) of the cutting insert shown in FIG. 2.

FIG. 3 shows the shape of the cross-section of the cutting insert 1 taken along the intermediate plane (M) in the side view of the cutting insert 1 shown in FIG. 2. As shown in FIG. 3, the outline showing the shape of the cross-section of the cutting insert 1 is formed into a regular polygon or an approximately regular polygon formed by alternately and sequentially connecting sides c and sides g (refer to FIG. 4) described later. The shape of the cross-section (FIG. 3) of the cutting insert 1 shown in FIG. 1 (FIG. 2) taken along the intermediate plane (M) is a regular hexadecagon in which each of the lengths of the sides c and the sides g is m. Hereinafter, the configuration of the side surface 4 will be described with reference to FIG. 4.

Figure 4:
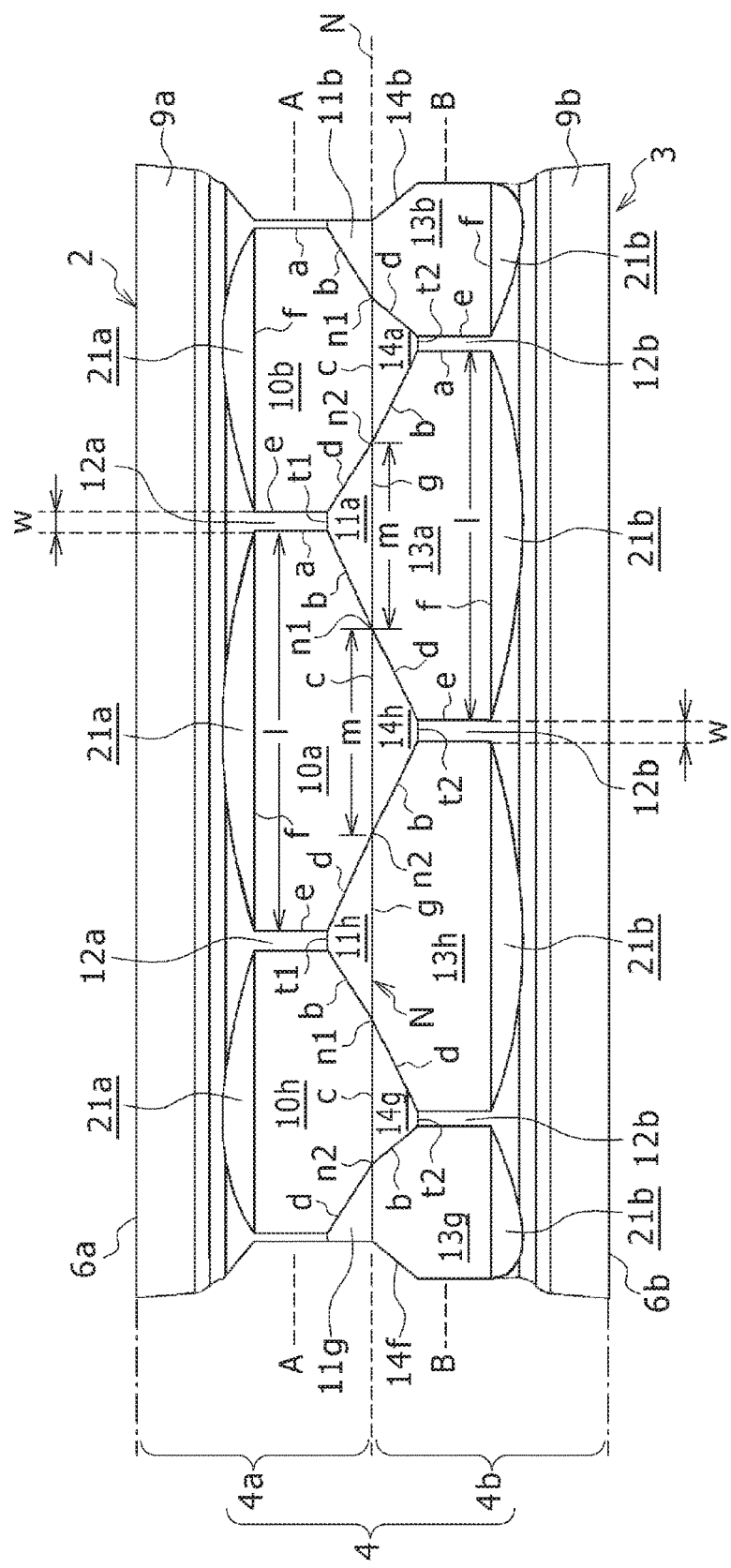
FIG. 4 is an enlarged view of the side view of the circular cutting insert shown in FIG. 2.

FIG. 4 is an enlarged view of the side view of the circular cutting insert 1 of the present embodiment shown in FIG. 2. The side surface 4 of the cutting insert 1 has characteristic configurations in the cutting insert of the present embodiment, and thus, hereinafter, the configuration of the side surface 4 will be described in detail.

Here, an imaginary ridgeline at which the intermediate plane M of the cutting insert 1 intersects with the side surface 4 is defined as a "side surface-intermediate line (N)" of the double-sided cutting insert. As described above, the intermediate plane (M) is the plane orthogonal to the central axis P and bisecting the double-sided circular cutting insert 1 in the thickness direction. Accordingly, in the descriptions below, the side surface 4 between the side surface-intermediate line (N) and the top surface 2 is referred to as an "upper side surface 4a", and the side surface 4 between the side surface-intermediate line (N) and the bottom surface 3 is referred to as a "lower side surface 4b". In the present embodiment, the upper side surface 4a and the lower side surface 4b have the same shape as each other. More specifically, the lower side surface 4b has a shape obtained by inverting the upper side surface 4a with respect to the intermediate plane (M) and rotating (shifting) the inverted upper side surface 4a about the central axis P by a predetermined angle α.

As shown in FIG. 4, the side surface 4 is formed so as to be slightly retracted with respect to end portions (peripheral edge portions) of the top surface 2 and the bottom surface 3 in the direction of the central axis P of the screw insertion hole 5, and thus, the cutting insert 1 is formed into a hourglass shape when viewed from the side surface. In other words, the side surface 4 has a shape which is recessed toward the inside in the radial direction with respect to a cylindrical surface obtained by connecting the cutting edge 6a of the top surface 2 and the cutting edge 6b of the bottom surface 3.

The upper side surface 4a configuring the side surface 4 includes: a flank face 9a of the cutting edge 6a which is formed along the peripheral edge portion of the top surface 2; and a plurality of planar restraining faces 10a, 10b, ..., between the flank face 9a and the side surface-intermediate line (N). The planar restraining faces 10a, 10b, ..., have the same shape as each other, each have a side c which is disposed on and along the side surface-intermediate line (N), and are sequentially disposed in one row in the circumferential direction of the upper side surface 4a so as to interpose a joint portion 12a between each of the planar restraining faces. In the circular cutting insert 1 shown in FIG. 1 (FIG. 4), an example in which eight planar restraining faces 10a, 10b, ..., and 10h are formed on the upper side surface 4a, is shown. However, in the circular cutting insert of the present invention, the number of the planar restraining faces 10a, 10b, ... is not limited to eight.

The flank face 9a is a conical face which extends so as to be inclined toward the inside in the radial direction from the cutting edge 6a toward the intermediate plane (M).

Each of the eight planar restraining faces 10a, 10b, ..., and 10h is formed so as to be a plane perpendicular to or approximately perpendicular to the top surface flat portion 8a of the top surface 2. The planar restraining faces 10a, 10b, ..., and 10h are disposed at equal intervals in the circumferential direction such that a circle centered on the central axis P is inscribed on the planar restraining faces 10a, 10b, ..., and 10h and the planar restraining faces 10a, 10b, ..., and 10h are rotationally symmetrical with respect to the central axis P.

In addition, the upper side surface 4a includes: a plurality of joint portions 12a which each connect two planar restraining faces 10a and 10b, 10b and 10c, ..., and 10h and 10a which are each adjacent to each other in the direction along the side surface-intermediate line (N) (the circumferential direction of the upper side surface 4a); and a plurality of antivibration restraining faces 11a, 11b, ..., which are each formed from a lower end portion (apex portion (t1) shown in FIG. 4) of each of the joint portions 12a closer to the side surface-intermediate line (N) to the side surface-intermediate line (N) and are each formed into a trapezoidal shape when viewed from the side surface of the cutting insert 1. In the circular cutting insert 1 shown in FIG. 1 (FIG. 4), an example in which eight antivibration restraining faces 11a, 11b, ..., and 11h formed into the same shape are provided, is shown. The number of the antivibration restraining faces 11a 11b, ..., provided on the upper side surface 4a is the same as the number of the planar restraining faces 10a, 10b, .... In this way, the antivibration restraining faces 11a, 11b, ... are each formed between the planar restraining faces 10a and 10b, 10b and 10c, ..., which are each adjacent to each other. The antivibration restraining faces 11a, 11b, ... are disposed at equal intervals in the circumferential direction such that the circle centered on the central axis P is inscribed on the antivibration restraining faces 11a, 11b, . . . and the antivibration restraining faces 11a, 11b, . . . are rotationally symmetrical with respect to the central axis P.

Moreover, in the circular cutting insert 1 of the present embodiment, the shape of each of the antivibration restraining faces 11a, 11b, . . . , and 11h of the cutting insert 1 is a trapezoidal shape when viewed from the side surface. However, like a second embodiment described later, the shape when viewed from the side surface may be a triangular shape (refer to FIGS. 8 to 10).

Each of the planar restraining faces 10a, 10b, . . . , and 10h shown in FIG. 4 is formed in a hexagonal plane having a side a, a side b, the side c, a side d, a side e, and a side f, and among the sides, the side c is formed on and along the side surface-intermediate line (N). Each of the planar restraining faces 10a, 10b, . . . , and 10h is formed into a hexagonal shape which is linearly symmetric with respect to a perpendicular bisector of the side c. In addition, in FIG. 4, a length of the side f which faces the side c and is parallel to the side c is indicated by 1, and a length of the side c is indicated by m. In FIG. 3 showing the above-described shape of the cross-section of the cutting insert 1 taken along the intermediate plane (M), the shape of the outline thereof is shown so as to be a regular hexadecagon in which the length of one side is indicated by the above "m".

The disposition positions of the side a to the side f of each of the planar restraining faces 10a, 10b, . . . , and 10h formed into a plane and characteristics such as the connections thereof will be described as follow using the planar restraining face 10a shown in FIG. 4 as an example. The disposition positions of the side a to the side f of each of other planar restraining faces 10b, . . . , and 10h and characteristics such as the connections thereof are the same as those of the planar restraining face 10a.

(Side a)

The side a is a ridgeline (boundary line) between the joint portion 12a interposed between the planar restraining face 10a shown in FIG. 4 and the planar restraining face 10b adjacent to the planar restraining face 10a on the right side of the paper surface in the circumferential direction of the upper side surface 4a, and the planar restraining face 10a. In addition, the side a is formed to the lower end portion (the apex portion (t1) or the vicinity of the apex portion (t1)) of the joint portion 12a closer to the side surface-intermediate line (N) in the direction orthogonal to the intermediate plane (M). In other words, the side a is a straight line which extends from the apex portion (t1) or the vicinity thereof toward the top surface 2 in the thickness direction. Moreover, as shown in FIG. 4, the apex portion (t1) is positioned on the top surface 2 side (the outside in the thickness direction) from the intermediate plane (M).

(Side b)

The side b is a ridgeline which is inclined so as to form an obtuse angle with respect to the side a from the lower end portion of the side a closer to the side surface-intermediate line (N) and is formed to a point n1 on the side surface-intermediate line (N). In other words, the side b is a straight line which extends from the apex portion (t1) or the vicinity thereof to the point n1 in a direction separated from the planar restraining face 10b. In addition, the side b is formed as a ridgeline which is also one side of the antivibration restraining face 11a described later and is positioned between the planar restraining face 10a and the antivibration restraining face 11a.

(Side c)

The side c has the length m from the point n1 of the side b on the side surface-intermediate line (N) and is formed to a point n2 on the side surface-intermediate line (N) along the side surface-intermediate line (N). The side c is a straight line which forms an obtuse angle with respect to the side b and extends in a direction perpendicular to the side a.

(Side d)

The side d is formed as a ridgeline which is inclined so as to form an obtuse angle with respect to the side c from the point n2 of the side c on the side surface-intermediate line (N) to the lower end portion (the apex portion (t1) or the vicinity of the apex portion (t1)) of the joint portion 12a interposed between the planar restraining face 10a and another planar restraining face 10h adjacent to the left side on the paper surface of the planar restraining face 10a. In other words, the side d is a straight line which extends from the point n2 to the apex portion (t1) or the vicinity thereof in the direction approaching the top surface 2. In addition, the side d is formed as a ridgeline which is also one side of another antivibration restraining face 11h described later and is positioned between the planar restraining face 10a and the antivibration restraining face 11h. Moreover, the side d is connected to the lower end portion of the side e described later closer to the side surface-intermediate line (N) so as to form an obtuse angle with respect to the side e. In addition, the angle between the side c and the side d is the same as the angle between the side c and the side b, and the angle between the side d and the side e is the same as the angle between the side b and the side a. Moreover, the length of the side d is the same as the length of the side b.

(Side e)

The side e is a ridgeline between the joint portion 12a interposed between the planar restraining face 10a and another planar restraining face 10h adjacent to the left side on the paper surface of the planar restraining face 10a, and the planar restraining face 10a, and the side e is formed in a direction orthogonal to the intermediate plane (M). In other words, the side e is a straight line which extends from the lower end portion (the apex portion (t1) or the vicinity of the apex portion (t1)) of the joint portion 12a toward the top surface 2 in the thickness direction. The length of the side e is the same as the length of the side a.

(Side f)

The side f is a straight line which connects the upper end portion (the end portion closer to the top surface 2) of the side e and the upper end portion (the end portion closer to the top surface 2 side) of the side a and is parallel to the side c, and has the length l in the circumferential direction (more accurately, in a direction parallel to the side c) of the side surface 4. The side f is orthogonal to the side a and the side e.

For example, each joint portion 12a for connecting the adjacent two planar restraining faces in the circumferential direction of the upper side surface 4a to each other may be integrally molded during powder molding of the circular cutting insert 1 such that the side a and the side e facing each other of the planar restraining face 10a and the planar restraining face 10b adjacent to each other in the circumferential direction are integrated so as to be one straight-line ridgeline (refer to the second embodiment described later). Meanwhile, unlike the above-described case, as shown in FIG. 4, in the case of providing the joint portion 12a having a predetermined width w in the circumferential direction of the side surface 4 and connecting the planar restraining faces adjacent to each other through the joint portion 12a to each other, strength of the joint portion is effectively and maintained, which is preferable. In FIG. 4, in order to clarify differences between the first embodiment and the second embodiment described later, the width w of the joint portion 12a is drawn larger than an actual width.

The value of the width w (an interval between the side a and the side e) of the joint portion 12a in the circumferential direction of the side surface 4 (upper side surface 4a) may be appropriately set according to a diameter of the top surface 2 (bottom surface 3) of the circular cutting insert 1. However, it is desirable that the width w is set to be at least approximately 0.5 mm to 1 mm, and that the shape of the surface of the joint portion 12a in the cross-section thereof is a gentle arc shape (R shape). That is, it is desirable that each joint portion 12a is a surface formed into an arc shape protruding toward the outside in the radial direction in the cross-section of the joint portion 12a orthogonal to the central axis P.

In addition, in each joint portion 12a, a portion positioned to be separated from the intermediate plane (M) toward the top surface 2 is served as an end portion (a lower end portion) closer to the side surface-intermediate line (N), and the joint portion 12a extends from the end portion toward the top surface 2 in the thickness direction.

In the cutting insert 1 of the first embodiment, similarly to the upper side surface 4a, the lower side surface 4b includes eight planar restraining faces 13a, 13b, . . . , and 13h and eight antivibration restraining faces 14a, 14b, . . . , and 14h each formed into a trapezoidal shape in a planar view.

Next, characteristics of the antivibration restraining faces 11a, 11b, . . . , and 11h which are provided on the upper side surface 4a and are each formed into a trapezoidal shape when the cutting insert 1 is viewed from the side surface and the disposition positions thereof will be described using the antivibration restraining face 11a shown in FIG. 4 as an example.

The antivibration restraining face 11a, which is formed into a trapezoidal shape when the cutting insert 1 is viewed from the side surface, is an isosceles trapezoidal (or an approximately isosceles trapezoidal) face having the apex portion (t1) formed on the lower end portion of the joint portion 12a closer to the side surface-intermediate line (N) as an upper base (t1) of the trapezoid and a line segment obtained by connecting the two points (points n1 and n2) on the side surface-intermediate line (N) to each other as a lower base. The upper base (t1) is a ridgeline having the minute width w of the joint portion 12a provided between the planar restraining face 10a and the adjacent planar restraining face 10b, and the upper base (t1) is formed to be parallel to or approximately parallel to the side surface-intermediate line (N).

Meanwhile, in the lower base having an isosceles trapezoid, one side on the side surface-intermediate line (N) is the lower base g of the antivibration restraining face 11a, and the one side is obtained by connecting the point (n1) at which the side b and the side c of the planar restraining face 10a intersect with each other and the point (n2) at which the side c and the side d of the planar restraining face 10b adjacent to the planar restraining face 10a intersect with each other. In addition, as shown in FIG. 4, two sides becoming legs of the isosceles trapezoid are the side b of the planar restraining face 10a and the side d of the planar restraining face 10b adjacent to the planar restraining face 10a. In this way, in the two sides b and d becoming the legs of the trapezoid of the antivibration restraining face 11a configuring the isosceles trapezoid, the leg b of the trapezoid is configured so as to be the ridgeline which is also the side b of the planar restraining face 10a. In addition, another leg d of the trapezoid is configured so as to be the ridgeline which is also the side d of the planar restraining face 10b.

Moreover, as shown in FIG. 4, the lower base g has the same length m as the length m of the one side c of the planar restraining face 10a formed on the side surface-intermediate line (N).

As described above, the antivibration restraining face 11a formed into an isosceles trapezoidal shape when the cutting insert 1 is viewed from the side surface is formed (disposed) between the planar restraining face 10a and the planar restraining face 10b adjacent to each other, in which the ridgeline having the width w on the apex portion of the joint portion 12a is the upper base (t1), and the side having the length m on the side surface-intermediate line (N) obtained by connecting the point (n1) at which the side b and the side c of the planar restraining face 10a intersect with each other and the point (n2) at which the side c and the side d of the planar restraining face 10b adjacent to the planar restraining face 10a intersect with each other is the lower base g. Accordingly, in the antivibration restraining face 11a formed into an isosceles trapezoidal shape when the cutting insert 1 is viewed from the side surface, the length of the antivibration restraining face 11a in the circumferential direction gradually increases from the upper base (t1) toward the lower base g. In addition, the antivibration restraining face extends to be inclined to the inside in the radial direction from the upper base (t1) to the lower base g.

Similarly, the antivibration restraining face 11b is disposed between the planar restraining face 10b and the planar restraining face 10c (not shown in FIG. 4) adjacent to the planar restraining face 10b through the joint portion 12a, in which the line segment having the width w on the apex portion of the joint portion 12a is the upper base (t1) and the side having the length m on the side surface-intermediate line (N) obtained by connecting the point (n1) at which the side b and the side c of the planar restraining face 10b intersect with each other and the point (n2) at which the side c and the side d of the planar restraining face 10c adjacent to the planar restraining face 10b intersect with each other is the lower base g. In this way, other antivibration restraining faces 11c, 11d, . . . , and 11h are also formed between the adjacent planar restraining faces so as to have specifications such as the shapes, the dimensions, or dispositions similar to those of the antivibration restraining faces 11a and 11b.

Similarly to the upper side surface 4a, the lower side surface 4b configuring the side surface 4 includes: a flank face 9b of the cutting edge 6b formed along the peripheral edge of the bottom surface 3; eight planar restraining faces 13a, 13b, . . . , and 13h which are each formed into the same shape between the flank face 9b and the side surface-intermediate line (N) and each have one side disposed on and along the side surface-intermediate line (N); and eight antivibration restraining faces 14a, 14b, . . . , and 14h which are each formed into an isosceles trapezoid formed to the side surface-intermediate line (N) from an apex portion (t2), which is closer to the side surface-intermediate line (N), of each of the joint portions 12b between the planar restraining faces 13a and 13b, 13b and 13c, . . . , and 13h and 13a adjacent to each other in the circumferential direction of the lower side surface 4b. Each of the planar restraining faces 13a, 13b, . . . , and 13h is formed so as to be a plane which is perpendicular to or approximately perpendicular to the bottom surface flat portion 8b (top surface flat portion 8a).

Similarly to the apex portion (t1) of the upper side surface 4a, the apex portion (t2) shown in FIG. 4 has the width w in the circumferential direction of the upper side surface 4a and is the upper base of each of the antivibration restraining faces 14a, 14b, and 14h formed in an isosceles trapezoid when the cutting insert 1 is viewed from the side surface.

The planar restraining faces 13a, 13b, . . . , and 13h provided on the lower side surface 4b and the planar restraining faces 10a, 10b, . . . , and 10h provided on the upper side surface 4a have the same shape as each other, the directions of the dispositions thereof are inverted with respect to the side surface-intermediate line (N), and the planar restraining faces 13a, 13b, . . . , and 13h and the planar restraining faces 10a, 10b, . . . , and 10h are disposed so as to be shifted from each other in the upper side surface 4a and the lower side surface 4b.

Similarly, the antivibration restraining faces 14a, 14b, . . . , and 14h provided on the lower side surface 4b and the antivibration restraining faces 11a, 11b, . . . , and 11h provided on the upper side surface 4a have the same shape as each other, the directions and the dispositions thereof are inverted with respect to the side surface-intermediate line (N), and the antivibration restraining faces 14a, 14b, . . . , and 14h and the antivibration restraining faces 11a, 11b, . . . , and 11h are disposed so as to be shifted from each other in the upper side surface 4a and the lower side surface 4b. Here, the "shifting" means rotating the lower side surface 4b with respect to the upper side surface 4a about the central axis P of the screw insertion hole 5 from a state where the upper side surface 4a and the lower side surface 4b having the same shape as each other are disposed so as to be mirror-symmetrical with respect to the side surface-intermediate line (N).

In this way, in FIG. 4, the planar restraining faces and the antivibration restraining faces of each of the upper side surface 4a and the lower side surface 4b each have the same shape as each other, and thus, the corresponding reference numerals of the sides configuring each of the restraining faces of the upper side surface 4a are assigned to the sides configuring each of the restraining faces of the lower side surface 4b. Shift specifications at the positions where the restraining faces of the upper side surface 4a and the restraining faces of the lower side surface 4b are disposed will be described later, and the restraining faces of the upper side surface 4a and the restraining faces of the lower side surface 4b are shifted from each other by a predetermined angle (α) with respect to the central axis P of the screw insertion hole 5. In other words, the restraining faces of the upper side surface 4a and the restraining faces of the lower side surface 4b are disposed at positions at which the restraining faces of the lower side surface 4b rotates by the predetermined angle (α) with respect to the restraining faces of the upper side surface 4a about the central axis P from a state where the restraining faces of the upper side surface 4a and the restraining faces of the lower side surface 4b are disposed so as to be mirror-symmetrical with respect to the side surface-intermediate line (N).

Accordingly, when the plurality of regions of the cutting edges 9a and 9b are selectively used by rotating the circular cutting insert 1, an accurate indexing function can be exerted.

As shown in FIG. 4, the side c of each of the planar restraining faces 10a, 10b, . . . , and 10h of the upper side surface 4a is also the lower base of each of the antivibration restraining faces 14a, 14b, . . . , and 14h of the lower side surface 4b which are each formed into an isosceles trapezoid when the cutting insert 1 is viewed from the side surface. In addition, in each of the planar restraining faces 13a, 13b, . . . , and 13h of the lower side surface 4b, one side formed along the side surface-intermediate line (N) is also the lower base g of each of the antivibration restraining faces 11a, 11b, . . . , and 11h of the upper side surface 4a. Accordingly, even when the top and bottom sides of the cutting insert 1 are reversed, the shapes of the cutting insert 1 are the same as each other, and thus, it is not necessary to change the shape of an insert mounting seat 32 formed on a tool main body 31 depending on whether the cutting edge to be used for the cutting operation is the cutting edge 6a of the top surface 2 or the cutting edge 6b of the bottom surface 3. That is, even when the cutting edge 6a of the top surface 2 is used or the cutting edge 6b of the bottom surface 3 is used, the cutting insert 1 can be attached to the same insert mounting seat 32.

When the cutting insert 1 is viewed from the side surface, the antivibration restraining faces 11a, 11b, . . . , and 11h which are each formed into an isosceles trapezoid on the upper side surface 4a and the antivibration restraining faces 14a, 14b, . . . , and 14h which are each formed into an isosceles trapezoid on the lower side surface 4b are disposed as described above. Accordingly, the lower bases g each having the length m on the antivibration restraining faces of the upper side surface 4a and the lower bases c each having the length m on the antivibration restraining faces of the lower side surface 4b are alternately disposed along the side surface-intermediate line (N) (FIG. 3). Accordingly, effects described later can be obtained.

In the length of each of the joint portions 12a and 12b of the upper side surface 4a and the lower side surface 4b, that is, the length of each of the side a and the side e, it is preferable that the length of each of the joint portions 12a and 12b in the direction of the central axis P of the screw insertion hole 5 is set to approximately 0.1 to 0.15 times the thickness (the distance between the cutting edge 6a and the cutting edge 6b in the thickness direction) of the circular cutting insert 1.

Figure 7:
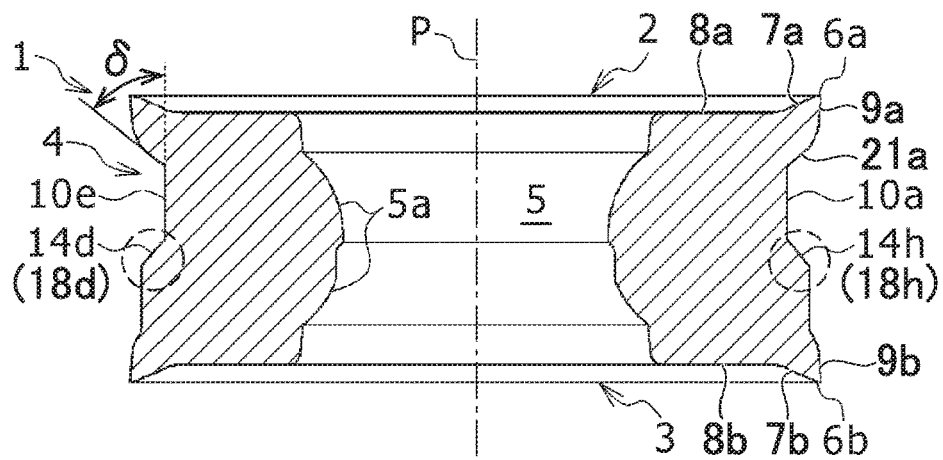
FIG. 7 is a longitudinal sectional view of the circular cutting insert shown in FIG. 1 passing through a central axis P of a screw insertion hole.

Reference numerals 21a and 21b shown in FIG. 4 indicate inclined faces provided so as to form the above-described planar restraining faces 10a, 10b, . . . , and 10h and planar restraining faces 13a, 13b, . . . , and 13h on the upper side surface 4a and the lower side surface 4b of the side surface 4. Each of the inclined faces 21a and 21b is formed so as to be inclined by a predetermined angle (δ) in the direction of the central axis P of the screw insertion hole 5 (FIG. 7). More specifically, the inclined face 21a is a surface which extends so as to be inclined to the outside in the radial direction from the side f of each of the planar restraining faces 10a, . . . , and 10h toward the flank face 9a, and the inclined face 21b is a surface which extends to the outside in the radial direction from the side f of each of the planar restraining faces 13a, . . . , and 13h toward the flank face 9b. As shown in FIG. 4, for example, each of the upper end portions of the joint portions 12a and 12b (end portions of the joint portions 12a and 12b on the outside in the thickness direction) is connected to the side surface 4a between the adjacent inclined faces 21a or between the adjacent inclined faces 21b. In other words, in the example of FIG. 4, the upper end portion of the joint portion 12a is smoothly continued to a region between the adjacent inclined faces 21a in the circumferential direction, and the upper end portion of the joint portion 12b is smoothly continued to a region between the adjacent inclined faces 21b in the circumferential direction.

Next, in the upper side surface 4a and the lower side surface 4b, the shifting of the positions of the planar restraining faces and the antivibration restraining faces disposed on the upper side surface 4a and the lower side surface 4b will be described with reference to FIG. 5.

Figure 5:
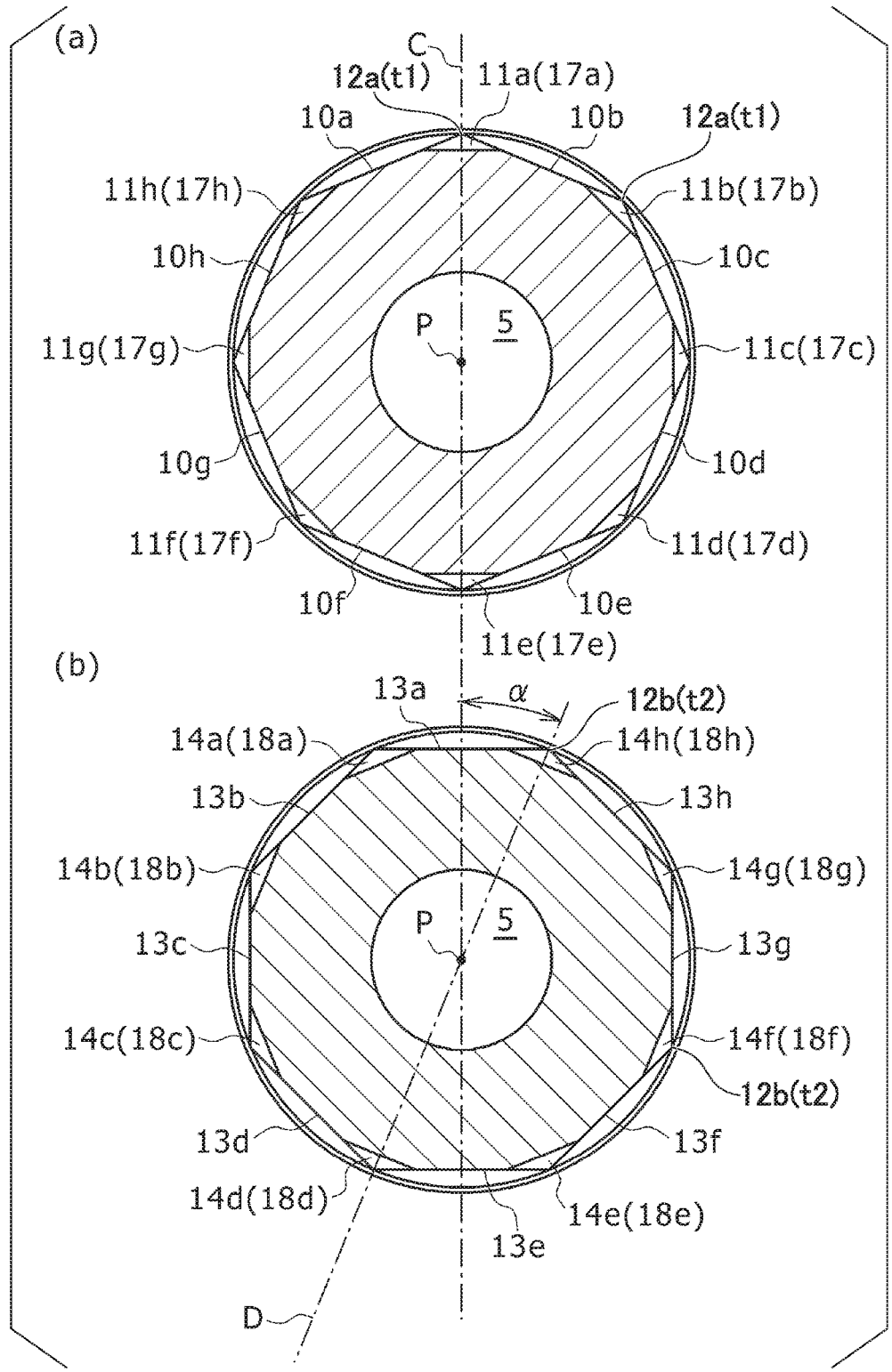
FIG. 5(*a*) is a sectional view when the cross-section taken along the intermediate plane (M) in the circular cutting insert shown in FIG. 2 is viewed toward a top surface from the cross-section and FIG. 5(*b*) is a sectional view when the cross-section is viewed toward a bottom surface from the cross-section.

FIG. 5 is a sectional view of the circular cutting insert 1 shown in FIG. 2 taken along the intermediate plane (M), FIG. 5(a) is a sectional view when the circular cutting insert 1 is viewed toward the top surface 2 from the cross-section, and FIG. 5(b) is a sectional view when the circular cutting insert 1 is viewed toward the bottom surface 3 from the cross-section. Similarly to FIG. 3, in FIG. 5(a), the planar restraining faces 10a, . . . , and 10h and the antivibration restraining faces 11a, . . . , and 11h are alternately disposed to be formed into a regular hexadecagonal shape, and in FIG. 5(b), the planar restraining faces 13a, . . . , and 13h and the antivibration restraining faces 14a, . . . , and 14h are alternately disposed to be formed into a regular hexadecagonal shape.

In addition, in FIGS. 5(a) and 5(b), the central axes P of the screw insertion holes 5 shown in FIGS. 5(a) and 5(b) are connected to each other by a straight line (dashed line) C such that the disposed positions of the planar restraining faces and the antivibration restraining faces disposed on the upper side surface 4a and the lower side surface 4b correspond to each other, and the disposed positions of the planar restraining faces and the antivibration restraining faces disposed on the upper side surface 4a and the lower side surface 4b are shown to correspond to each other with respect to the central axis P. In other words, in FIGS. 5(a) and 5(b), if FIG. 5(a) and FIG. 5(b) face each other such that the central axis P and the straight line C coincide with each other, the restraining faces of the upper side surface 4a and the restraining faces of the lower side surface 4b are shown by a sectional view to obtain the dispositions shown in FIGS. 1, 2, and 4. In FIG. 5, for simplification of explanation, the joint portions 12a and 12b are not shown, and only reference numerals are assigned to the positions thereof.

For example, FIG. 5 shows that, as shown in FIG. 5(b), the planar restraining face 13a is disposed on the lower side surface 4b corresponding to the position at which the antivibration restraining faces 11a of the upper side surface 4a shown in FIG. 5(a) is disposed. In other words, FIGS. 5(a) and 5(b) show that the position at which the antivibration restraining faces 11a of the upper side surface 4a is disposed and the position at which the planar restraining face 13a is disposed on the lower side surface 4b coincide with each other in the circumferential direction. In this way, FIGS. 5(a) and 5(b) show a correspondence between the positions (positions in the circumferential direction) at which the planar restraining faces and the antivibration restraining faces of the upper side surface 4a and the lower side surface 4b shown in FIG. 4 are disposed.

In addition, FIG. 5 shows that the dispositions of the planar restraining faces and the antivibration restraining faces of the upper side surface 4a and the lower side surface 4b are shifted by a predetermined angle (α) with respect to the central axis P of the screw insertion hole 5. Specifically, the angle (α) is formed between the straight line C passing through the center of the antivibration restraining face 11a of the upper side surface 4a (the center of the apex portion (t1) in the circumferential direction) shown in FIG. 5(a) and the central axis P of the screw insertion hole 5 and a straight line D passing through the center of the antivibration restraining face 14h of the lower side surface 4b (the center of the apex portion (t2) in the circumferential direction) shown in FIG. 5(b) and the central axis P of the screw insertion hole 5. This indicates the antivibration restraining faces 11a, . . . , and 11h disposed on the upper side surface 4a and the antivibration restraining faces 14a, . . . , and 14h disposed on the lower side surface 4b are formed such that the dispositions thereof (the positions in the circumferential direction) are shifted from each other by the angel (α) with respect to the central axis P of the screw insertion hole 5. Similarly, the planar restraining faces 10a, . . . , and 10h disposed on the upper side surface 4a and the planar restraining faces 13a, . . . , and 13h disposed on the lower side surface 4b are formed such that the dispositions thereof are shifted from each other by the angel (α) with respect to the central axis P of the screw insertion hole 5.

As described above, the circular cutting insert 1 shown in FIG. 1 is an embodiment (eight-corner type cutting insert) in which the eight planar restraining faces and the eight antivibration restraining faces are disposed in each of the upper side surface 4a and the lower side surface 4b. Accordingly, a shifting angle (an angle indicating phase differences between the upper side surface 4a and the lower side surface 4b) (α) of the disposition is set to 22.5 degrees (360 degrees/(2×8)).

In the circular cutting insert 1, in this way, the shifting angle (α) is set to 22.5 degrees, and thus, as shown in FIG. 4, the eight antivibration restraining faces 11a, 11b, . . . , and 11h which are each formed into an isosceles trapezoid when the cutting insert 1 is viewed from the side surface can be formed and disposed, in which the isosceles trapezoid has the end portion (apex portion (t1)) of the joint portion 12a of the upper side surface 4a of the circular cutting insert 1 closer to the side surface-intermediate line (N) as the upper base and the side of each of the planar restraining faces 13a, 13b, . . . , and 13h of the lower side surface 4b on the side surface-intermediate line (N) as the lower base. Similarly, the eight antivibration restraining faces 14a, 14b, . . . , and 14h which are each formed into an isosceles trapezoid when the cutting insert 1 is viewed from the side surface can be formed and disposed, in which the isosceles trapezoid has the end portion (apex portion (t2)) of the joint portion 12b of the lower side surface 4b closer to the side surface-intermediate line (N) as the upper base and the side of each of the planar restraining faces 10a, 10b, . . . , and 10h of the upper side surface 4a on the side surface-intermediate line (N) as the lower base. In addition, on the side surface-intermediate line (N), the sides c of the planar restraining faces 10b, 10c, . . . , and 10a of the upper side surface 4a which are also the lower bases of the antivibration restraining faces 14a, 14b, . . . , and 14h of the lower side surface 4b and the sides g of the planar restraining faces 13a, 13b, . . . , and 13h of the lower side surface 4b which are also the lower bases of the antivibration restraining faces 11a, 11b, . . . , and 11h of the upper side surface 4a each have the same length m and can be disposed so as to be alternately connected to each other.

Accordingly, in the cutting insert 1 which is the double-sided circular cutting insert, for example, in a case where an use region of the cutting edge 6a of the top surface 2 is changed and the cutting insert 1 is reattached to the insert mounting seat so as to perform the cutting operation, even when the use region of the cutting edge 6a is changed, the same performance of the cutting operation can be secured, that is, it is possible to prevent variations in the performance of the cutting operation. In addition, even in a case where the cutting operation is performed using the cutting edge 6b of the bottom surface 3, it is possible to secure the same performance of the cutting operation as that of the cutting edge 6a of the top surface 2.

In the double-sided circular cutting insert 1 of the present embodiment, the number (r) of each of the planar restraining faces and the antivibration restraining faces provided in each of the upper side surface 4a and the lower side surface 4b along the side surface-reference line (N) (side surface-intermediate line (N)), is eight. However, as the number (r) other than eight, it is desirable that the number is set to an even number such as six according to the diameter of the top surface 2 of the cutting insert 1. The reason is because, generally, the diameter of the top surface 2 of the circular cutting insert 1 is approximately 10 mm to 20 mm, and thus, in a case where the number (r) is six or eight, a mold for press-molding a powder molded body of the circular cutting insert 1 can be easily manufactured. In addition, in the powder molded body of the circular cutting insert 1, in order to manufacture a molded body which is uniformly filled with powder, it is desirable that the number (r) is set to eight or six. In addition, it is desirable that the number of the use regions of the cutting edges 6a and 6b increases to lengthen the life of one cutting insert in the cutting operation. Here, it is desirable to increase the number of the use regions of the cutting edges 6a and 6b. However, in order to prevent the length of the cutting edge per one use region from being shortened due to the increase of the divided number of the cutting edges 6a and 6b, preferably, the number (r) of each of the planar restraining faces and the antivibration restraining faces is set to ten or less.

Preferably, the shifting angle ($\alpha$) of the disposition is set to (360/2×r) degrees according to the number (r) of each of the planar restraining faces and the antivibration restraining faces (the number of corners) of each of the upper side surface 4a and the lower side surface 4b. More preferably, 18 degrees (r=10)≤$\alpha$≤(360/2×r) degrees is satisfied.

Figure 6:
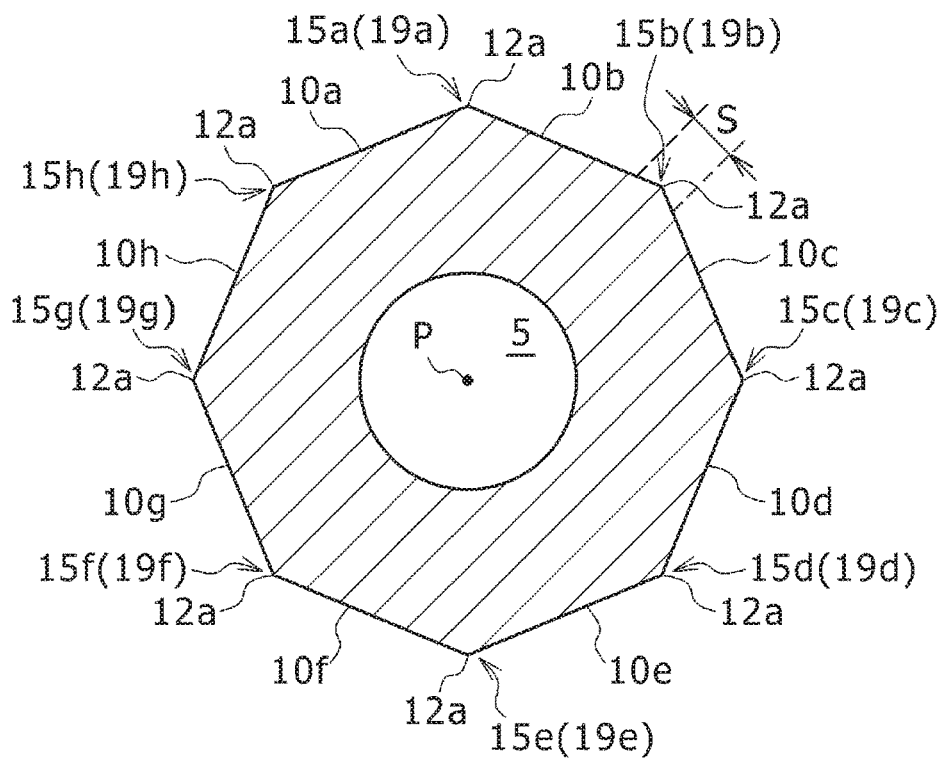
FIG. 6 is a sectional view taken along line A-A of the circular cutting insert shown in FIG. 4.

FIG. 6 is a sectional view taken along line A-A in the region of the upper side surface 4a on the side surface 4 of the cutting insert 1 shown in FIG. 4. That is, FIG. 6 shows a sectional view when the region each having the length 1 between the sides a and the sides e of the planar restraining faces 10a, 10b, . . . , and 10h formed on the upper side surface 4a is taken along line A-A orthogonal to the central axis P. In FIG. 6, for simplification of explanation, the joint portions 12a are not shown, and only reference numerals are assigned to the positions thereof.

As shown in FIG. 6, at locations at which the planar restraining faces 10a and 10b, 10b and 10c, . . . , and 10h and 10a adjacent in the circumferential direction of the upper side surface 4a are connected to each other through the joint portions 12a, regions S including a predetermined range of planar restraining faces from the sides a and the sides e of the adjacent two planar restraining faces form the corners (corner portions) 15a, 15b, . . . , and 15h which have the joint portions 12a as protruding apex portions. In addition, the corners 15a, . . . , and 15h have shapes protruding to the outside of the cutting insert 1 from the planar restraining faces 13a, 13b, . . . , and 13h which are disposed on the lower side surface 4b to correspond the positions of the corners 15a, . . . , and 15h (face the corners in the thickness direction). In other words, the corners 15a, 15b, . . . , and 15h are each disposed radially outside the planar restraining faces 13a, 13b, . . . , and 13h positioned at the same positions in the circumferential direction. In addition, the corners 15a, 15b, . . . , and 15h are disposed radially inside the cutting edge 6a of the upper side surface 4a (FIG. 7).

The corners 15a, 15b, . . . , and 15h formed by the adjacent two planar restraining faces 10a and 10b, . . . , and 10h and 10a are used as antirotation surfaces 19a, 19b, and 19h provided on the circular cutting insert 1 of the present embodiment, that is, a means of preventing the rotation of the circular cutting insert 1 when the circular cutting insert 1 is attached to the insert mounting seat 32 of the indexable rotary cutting tool 30. Functions of the antirotation surfaces 19a, 19b, . . . , and 19h for preventing the rotation of the circular cutting insert 1 will be described later.

Similarly, in the sectional view taken along line B-B in the region of the lower side surface 4b in the cutting insert 1 shown in FIG. 4, that is, in the sectional view when the region each having the length 1 between the sides a and the sides e of the planar restraining faces 13a, 13b, . . . , and 13h formed on the lower side surface 4b is taken along line B-B orthogonal to the central axis P, similarly to FIG. 6, at locations at which the planar restraining faces 13a and 13b, 13b, . . . , and 13h and 13a adjacent in the circumferential direction of the upper side surface 4a are connected to each other through the joint portions 12b, the regions S including a predetermined range of planar restraining faces from the sides a and the sides e of the adjacent two planar restraining faces 13a and 13b, 13b, . . . , and 13h and 13a are not shown, but the regions S form the corners (corner portions) 16a, 16b, . . . , and 16h which have the joint portions 12b as protruding apex portions. Similarly to the corners (corner portions) 15a, 15b, . . . , and 15h of the upper side surface 4a, the corners (corner portions) 16a, 16b, . . . , and 16h also configure the antirotation surfaces 20a, 20b, . . . , and 20h (not shown) in the circular cutting insert 1 of the present embodiment.

As described above, in the upper side surface 4a, the regions S including the joint portions 12a connecting the adjacent planar restraining faces 10a and 10b, . . . , and 10a and 10h in the circumferential direction of the side surface 4 to each other and the planar restraining faces 10a, 10b, . . . , and 10h around the joint portions 12a form the corners (corner portion) 15a, 15b, . . . , and 15h. The corners 15a, 15b, . . . , and 15h protrude to the outside of the cutting insert 1 from the planar restraining faces 13a, 13b, . . . , and 13h positioned in the region of the lower side surface 4b. Accordingly, each of the antivibration restraining faces 11a, 11b, . . . , and 11h which are each formed into a trapezoidal shape when the cutting insert 1 is viewed from the side surface is formed as an inclined face which is inclined downwardly from the apex portion (t1) which is the upper base, that is, the end portion of the joint portion 12a closer to the side surface-intermediate line (N) toward the side surface-intermediate line (N) which is the lower base g (which is inclined radially inward with respect to the thickness direction), and the length of each of the antivibration restraining faces 11a, 11b, . . . , and 11h in the circumferential direction of the side surface 4 gradually increases from the apex portion (upper base) (t1) toward the side surface-intermediate line (N).

Similarly to the upper side surface 4a, in the lower side surface 4b, each of the antivibration restraining faces 14a, 14b, . . . , and 14h which are each formed into a trapezoidal shape when the cutting insert 1 is viewed from the side surface is formed as an inclined face which is inclined upwardly from the apex portion (t2) which is the upper base, that is, the end portion of the joint portion 12b closer to the side surface-intermediate line (N) toward the lower base c on the side surface-intermediate line (N) (which is inclined radially inward with respect to the thickness direction), and the length of each of the antivibration restraining faces 14a, 14b, . . . , and 14h in the circumferential direction of the side surface 4 gradually increases from the apex portion (upper base) (t2) toward the side surface-intermediate line (N).

In this way, the antivibration restraining faces provided in each of the upper side surface 4a and the lower side surface 4b are formed such that the length of each of the antivibration restraining faces in the circumferential direction of the side surface 4 gradually increases toward the side surface-intermediate line (N), surface areas of the antivibration restraining faces are made as large as possible, and thus, an improved antivibration function is exerted. The antivibration functions of the antivibration restraining faces will be described in detail later.

The antivibration restraining faces 11a, 11b, ..., and 11h of the upper side surface 4a and the antivibration restraining faces 14a, 14b, ..., and 14h of the lower side surface 4b are formed as the inclined faces which are inclined upwardly or downwardly (inclined faces which are inclined radially inward with respect to the thickness direction) from the apex portions (t1) and the apex portions (t2) toward the side surface-intermediate line (N), and in FIGS. 5(a) and 5(b), the inclined faces of the antivibration restraining faces are shown as the inclined faces 17a, 17b, ..., and 17h and the inclined faces 18a, 18b, ..., and 18h. In addition, in FIG. 6, the corners (corner portions) 15a, 15b, ..., and 15h provided on the upper side surface 4a are shown.

Preferably, an angle at which each of the antivibration restraining faces 11a, 11b, ..., and 11h of the upper side surface 4a and each of the antivibration restraining faces 14a, 14b, ..., and 14h of the lower side surface 4b are inclined downwardly or inclined upwardly, that is, an angle at which each antivibration restraining face intersects with the intermediate plane (M) is set to a range from 40 degrees to 60 degrees. The reason is because if the angle is less than 40 degrees, the area of each antivibration restraining face decreases, and as described later, a contact area between the antivibration restraining faces and the antivibration wall surface 42 of the insert mounting seat 32 decreases, and thus, sufficient antivibration effects cannot be obtained. Meanwhile, in a case where the angle exceeds 60 degrees, a component force of a cutting force acts on the antivibration restraining faces, a component in the thickness direction of the cutting insert 1 of a force by which the antivibration wall surface 42 is pressed by the antivibration restraining faces decreases, and thus, antivibration effects decrease. More preferably, the intersecting angle is 45 degrees to 55 degrees.

FIG. 7 shows a view showing a longitudinal section of the circular cutting insert 1 which passes through the central axis P of the screw insertion hole 5 and intersects with the antivibration restraining faces 14d and 14h (a view showing a cross-section taken along the straight line D shown in FIG. 5(b)). In dotted circles shown in FIG. 7, as examples of lines showing the cross-sectional shapes of the surfaces of the antivibration restraining faces 14a, 14b, ..., and 14h provided on the lower side surface 4b, the cross-sections of the antivibration restraining faces 14d and 14h are shown. Each of the cross-sections of the antivibration restraining faces 14d and 14h is formed into a straight-line shape. In this way, the present embodiment shows the example configured of the restraining faces in which the antivibration restraining faces 14a, 14b, ..., and 14h are formed into flat planes.

The antivibration restraining faces 11a, 11b, ..., 11h, 14a, 14b, ..., and 14h provided on the upper side surface 4a and the lower side surface 4b of the side surface 4 are not limited to the flat planar shapes as shown in FIG. 7.

As shown in FIG. 7, an inner diameter reduced portion 5a is formed on an inner peripheral surface of the screw insertion hole 5, and an inner diameter of the inner diameter reduced portion 5a gradually decreases toward the inside in the thickness direction so as to engage with a lower end portion of a head portion of a clamp screw 35 inserted into the screw insertion hole 5 when the circular cutting insert 1 is fixed to the seating surface 33.

(Second Embodiment of Circular Cutting Insert)

Figure 8:
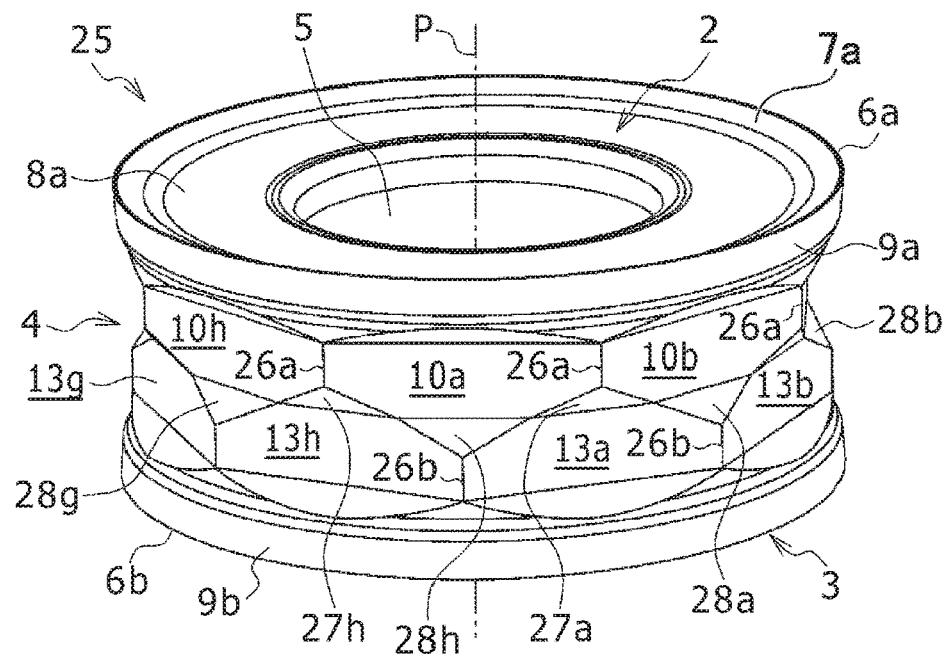
FIG. 8 is a perspective view showing a second embodiment of the circular cutting insert of the present invention.
Figure 9:
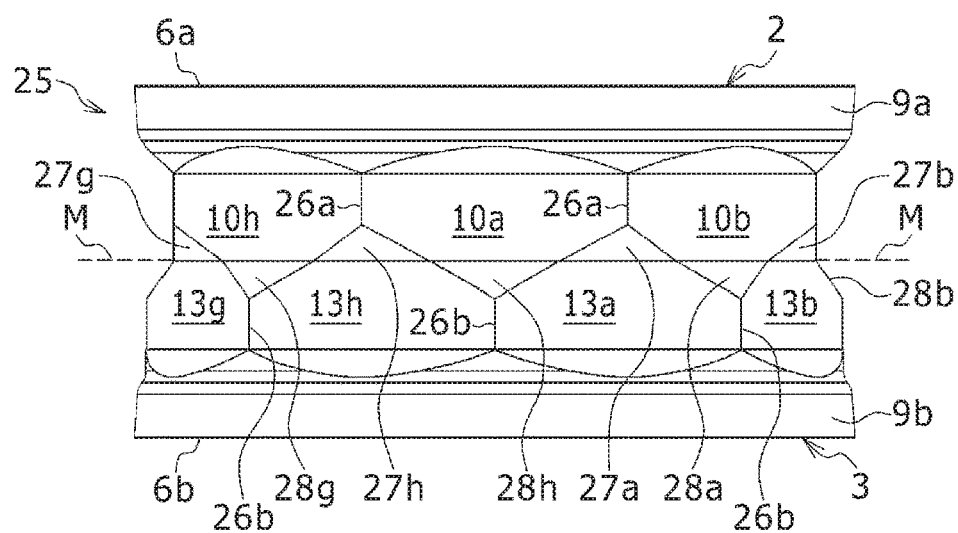
FIG. 9 is a side view of the circular cutting insert shown in FIG. 8.
Figure 10:
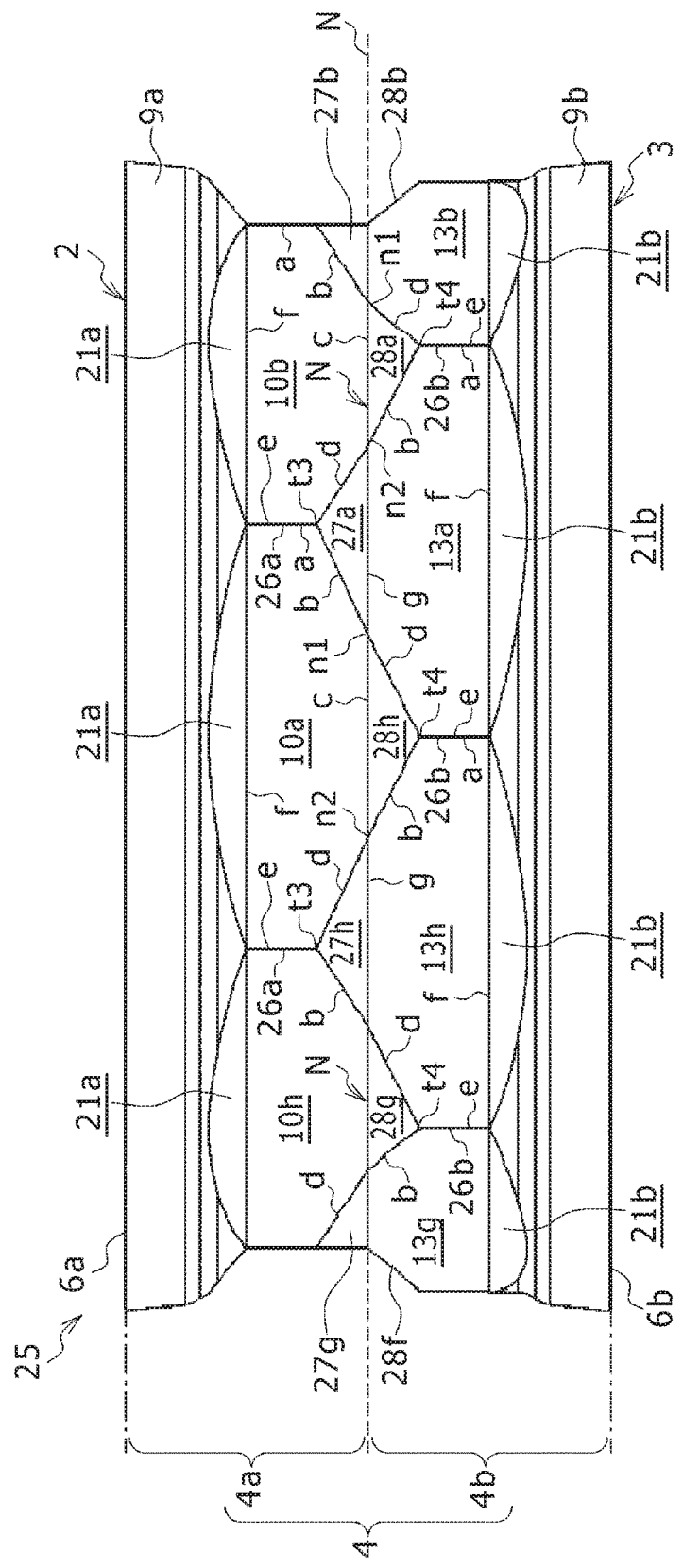
FIG. 10 is an enlarged view of the side view of the circular cutting insert shown in FIG. 9.

Next, a second embodiment of the circular cutting insert of the present invention will be described. FIG. 8 is a perspective view of a circular cutting insert 25 according to the second embodiment, FIG. 9 is a side view of the circular cutting insert 25, and FIG. 10 is an enlarged view of the side view shown in FIG. 9. The cutting insert 25 according to the second embodiment is mainly different from the cutting insert 1 according to the above-described first embodiment as described in the following (1) and (2). In addition, the same reference numerals are assigned to configurations which are the same as those of the first embodiment, and descriptions thereof are omitted.

(1) In the second embodiment, in the eight planar restraining faces which are sequentially disposed on the upper side surface 4a and the lower side surface 4b of the side surface 4 in the circumferential direction, the ridgelines (side a and side e) which are the end portion of the adjacent two planar restraining faces are configured so as to be directly connected to each other. In the descriptions below, the portion connecting the ridgelines of the end portions of the adjacent two planar restraining faces to each other is referred to as a "joint ridgeline". Joint portions 26a and 26b are joint portions which replace the joint portions 12a and 12b of the first embodiment and are each configured of a ridgeline having a minute width. In other words, in the second embodiment, the widths w of the joint portions 12a and 12b in the circumferential direction in the first embodiment are made extremely small so as to be the joint ridgelines 26a and 26b.

(2) According to the above (1), in the second embodiment, each of antivibration restraining faces 27a, 27b, ..., and 27h is formed into a triangular shape (an isosceles triangular shape or an approximately isosceles triangular shape) when the cutting insert 25 is viewed from the side surface.

Moreover, the shape of each of the planar restraining faces provided on the cutting insert 25 in the second embodiment is substantially the same as that of the cutting insert 1 of the first embodiment, and thus, in FIGS. 8 to 10, the reference numerals assigned to the planar restraining faces 10a, 10b, ..., and 10h and the planar restraining faces 13a, 13b, ..., and 13h and the reference numerals assigned to the sides a, b, ..., and f in the first embodiment are used as they are.

Hereinafter, characteristics of the cutting insert 25 of the second embodiment will be described. As shown in FIG. 10, in the eight planar restraining faces 10a, 10b, ..., and 10h which are sequentially disposed in the circumferential direction of the upper side surface 4a, the ridgelines of each of the adjacent two planar restraining faces 10a and 10b, 10b and 10c, ..., and 10h and 10a are connected to each other through the minute joint ridgeline 26a (having a minute circumferential width). As described above, in the joint ridgelines 26a, the side a and side e which are end portions in the circumferential direction of each of the adjacent two planar restraining faces 10a and 10b, 10b and 10c, ..., and 10h and 10a are made to be one minute connection ridgeline, and thus, it is possible to form the connection ridgeline when press molding is performed using a mold to obtain a power molded body of the cutting insert 25. In addition, preferably, in order to prevent chipping, the joint ridgelines 26a are each molded so as to have a R shape when the press molding is performed, and after the powder molded body is sintered, the joint ridgelines 26a are formed to be a ridgeline (curved surface) having a minute line width of approximately 0.2 R.

Similarly, in the eight planar restraining faces 13a, 13b, ..., and 13h which are sequentially disposed in the circumferential direction of the lower side surface 4b, the adjacent two planar restraining faces 13a and 13b, 13b and 13c, ..., and 13h and 13a are each connected to each other in the circumferential direction through the joint ridgeline 26b.

In the upper side surface 4a, the eight antivibration restraining faces 27a, 27b, ..., and 27h, which are provided between the adjacent planar restraining faces 10a and 10b, 10b and 10c, ..., and 10h and 10a through the joint ridgelines 26a, are formed so as to each have a triangular shape when the cutting insert 25 is viewed from the side surface. The cutting insert 25 is the double-sided circular cutting insert, and thus, in order to secure the same performance of the cutting operation even when the use regions of the cutting edges 6a and 6b are changed, each of the eight antivibration restraining faces 27a, 27b, . . . , and 27h is formed into an isosceles triangular face or an approximately isosceles triangular face (an equilateral triangular face or an approximately equilateral triangular face) when the cutting insert 25 is viewed from the side surface.

As shown in FIG. 10, in the triangle of each of the antivibration restraining faces 27a, 27b, . . . , and 27h of the upper side surface 4a, the end portion of the joint ridgeline 26a closer to the side surface-intermediate line (N) is a vertex (apex) (t3) of the triangle, the one side g on the side surface-intermediate line (N) is the base of the triangle facing the vertex (t3) as the apex, and the side b and the side d of the two planar restraining faces adjacent to each other through the joint ridgeline 26a are inclined sides of the triangle. In addition, each of the antivibration restraining faces 27a, 27b, . . . , and 27h is formed so as to be an inclined face which is inclined downwardly from the vertex (t3) toward the base g (inclined radially inward with respect to the thickness direction), and is formed such that the length thereof in the circumferential direction of the side surface 4 gradually increases toward the side surface-intermediate line (N).

Similarly to the upper side surface 4a, also in the lower side surface 4b, the adjacent planar restraining faces 13a and 13b, 13b and 13c, . . . , and 13h and 13a are connected to each other through the minute joint ridgelines 26b, and each of antivibration restraining faces 28a, 28b, . . . , and 28h provided between the adjacent planar restraining faces is formed so as to have a triangular shape (an isosceles triangular shape or an equilateral triangular shape) when the cutting insert 25 is viewed from the side surface. In the triangle of each of the antivibration restraining faces 28a, 28b, . . . , and 28h, the end portion of the joint ridgeline 26b closer to the side surface-intermediate line (N) is a vertex (apex) (t4) of the triangle, the one side c on the side surface-intermediate line (N) is the base of the triangle facing the vertex (t4) as the apex, and the side b and the side d of the two planar restraining faces adjacent to each other through the joint ridgeline 26a are inclined sides of the triangle. In addition, each of the antivibration restraining faces 28a, 28b, . . . , and 28h is formed so as to be an inclined face which is inclined upwardly from the vertex (t4) toward the base c (inclined radially inward with respect to the thickness direction), and the length thereof in the circumferential direction of the side surface 4 gradually increases toward the side surface-intermediate line (N).

Moreover, preferably, the length of each of the joint ridgelines 26a and 26b of the upper side surface 4a and the lower side surface 4b, that is, the length of the side a or the side e in the direction of the central axis P of the screw insertion hole 5 is set to approximately 0.1 to 0.15 times the thickness of the circular cutting insert 25.

Figure 17:
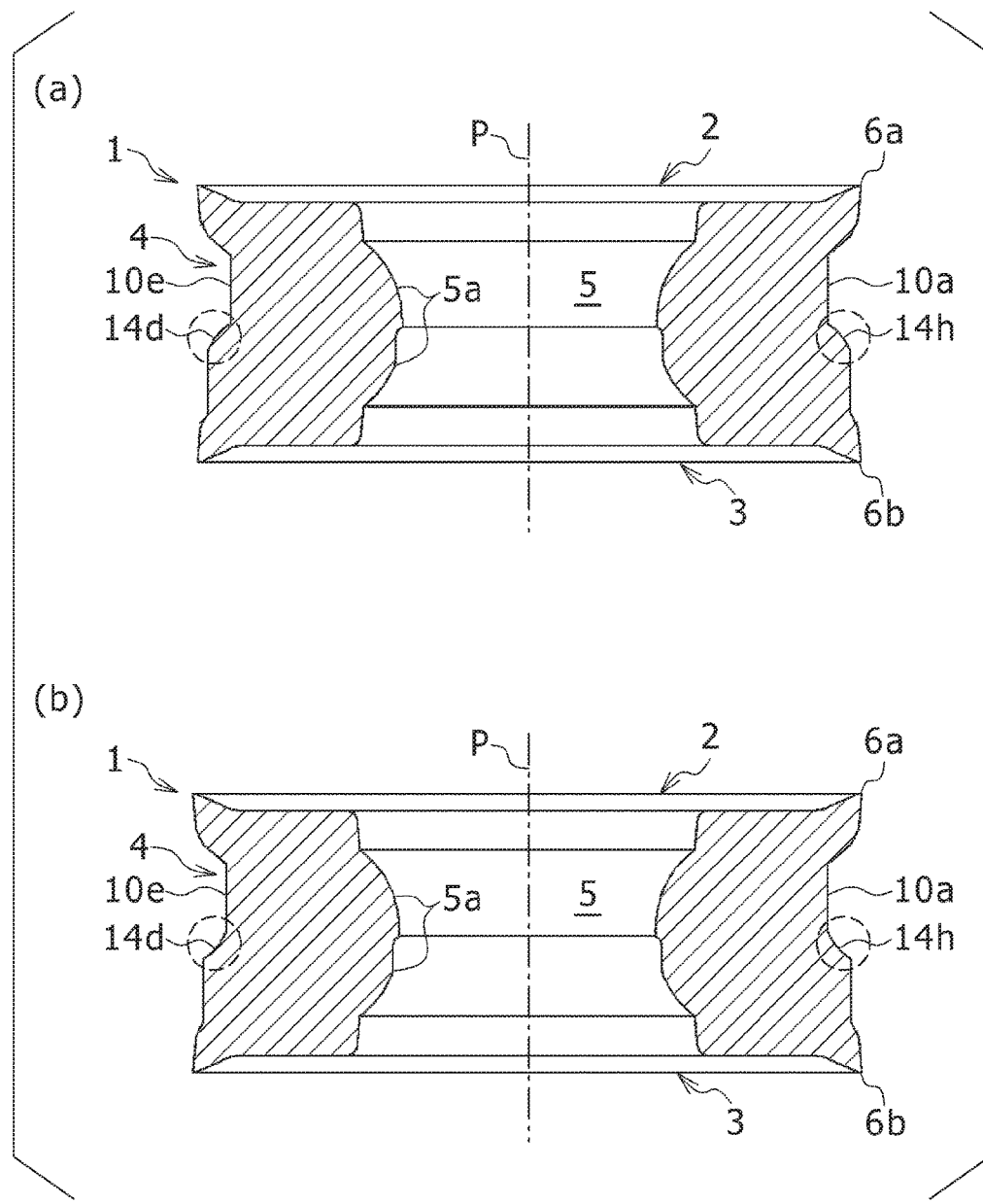
FIG. 17 is a longitudinal sectional view of a circular cutting insert according to another embodiment of the present invention passing through the central axis P of the screw insertion hole and is a view for explaining antivibration restraining faces of the circular cutting insert.

The line showing the cross-sectional shape of each of the antivibration restraining faces shown in the view of the longitudinal section which passes through the central axis P of the screw insertion hole 5 of the cutting insert 25 according to the second embodiment, may be formed into a straight-line shape as shown in FIG. 7 in the first embodiment or may be formed into a gentle convex-line shape or concave-line shape (FIG. 17).

In the first embodiment of the circular cutting insert of the present invention, the joint portion 12a or 12b having the predetermined width w is provided between the two planar restraining faces adjacent to each other in the circumferential direction of the side surface 4, the adjacent planar restraining faces are connected to each other through the joint portions 12a (12b), and thus, strength of the joint portions is secured. Meanwhile, in the second embodiment of the circular cutting insert, the two planar restraining faces adjacent to each other in the circumferential direction of the side surface 4 are connected to each other through the minute straight-line ridgeline (joint ridgeline 26a or 26b) (having the minute width) formed into an R shape. Accordingly, when a mold for press-molding the powder molded body of the circular cutting insert 25 of the second embodiment is compared with a mold for press-molding the powder molded body of the circular cutting insert 1 of the first embodiment, in the second embodiment, it is possible to simplify a structure of a mold cavity, and thus, the filling density of powder of the powder molded body can be made uniform.

In the region of the upper side surface 4a of the circular cutting insert 25 according to the second embodiment, similarly to the circular cutting insert 1 according to the above-described first embodiment, at locations at which the planar restraining faces 10a and 10b, 10b and 10c, . . . , and 10h and 10a adjacent in the circumferential direction of the upper side surface 4a are connected to each other through the joint ridgelines 12a, regions including a predetermined range of planar restraining faces in the upper side surface 4a from the sides a and the sides e of the adjacent two planar restraining faces 10a and 10b, . . . form the corners (corner portions) which have the joint ridgelines 26a as protruding center portions. The corners have shapes protruding to the outside of the cutting insert 25 from the planar restraining faces 13a, 13b, . . . , and 13h which are disposed on the lower side surface 4b to correspond (face) the disposed positions of the corners. In other words, the corners are each disposed radially outside the planar restraining faces 13a, 13b, . . . , and 13h positioned at the same positions in the circumferential direction. In addition, the corners are disposed radially inside the cutting edge 6a of the upper side surface 4a.

Similarly to the cutting insert 1 of the above-described first embodiment, the corners formed by the adjacent two planar restraining faces 10a and 10b, 10b and 10c, . . . , and 10h and 10a are used as antirotation surfaces 19a, 19b, (not shown in FIG. 10) described later, that is, as a means of preventing the rotation of the circular cutting insert 25 when the circular cutting insert 25 is attached to the insert mounting seat 32 of the indexable rotary cutting tool 30.

Similarly to the upper side surface 4a, also in the lower side surface 4b of the circular cutting insert 25, the locations at which the adjacent planar restraining faces 13a and 13b, 13b and 13c, . . . , and 13h and 13a are connected to each other through the joint ridgelines 26b and regions around the locations form corners (corner portions), and the corners are used as a means (antirotation surfaces 20a, 20b, . . . , and 20h) (not shown) of preventing the rotation of the circular cutting insert 25.

(Embodiment of Indexable Rotary Cutting Tool)

Next, in the indexable rotary cutting tool to which the above-described double-sided circular cutting insert of the present invention is attached, an embodiment thereof and a restraining structure for attaching the circular cutting insert to the insert mounting seat so as to restrain the circular cutting insert will be described with reference to FIGS. 11 to 16. Here, in the following descriptions of the indexable rotary cutting tool, a direction along a rotational axis of the indexable rotary cutting tool is referred to as an axial direction, a direction orthogonal to the rotational axis is referred to as a radial direction (radial direction of the tool main body), and a direction around the rotational axis is referred to as a circumferential direction (circumferential direction of the tool main body).

Figure 11:
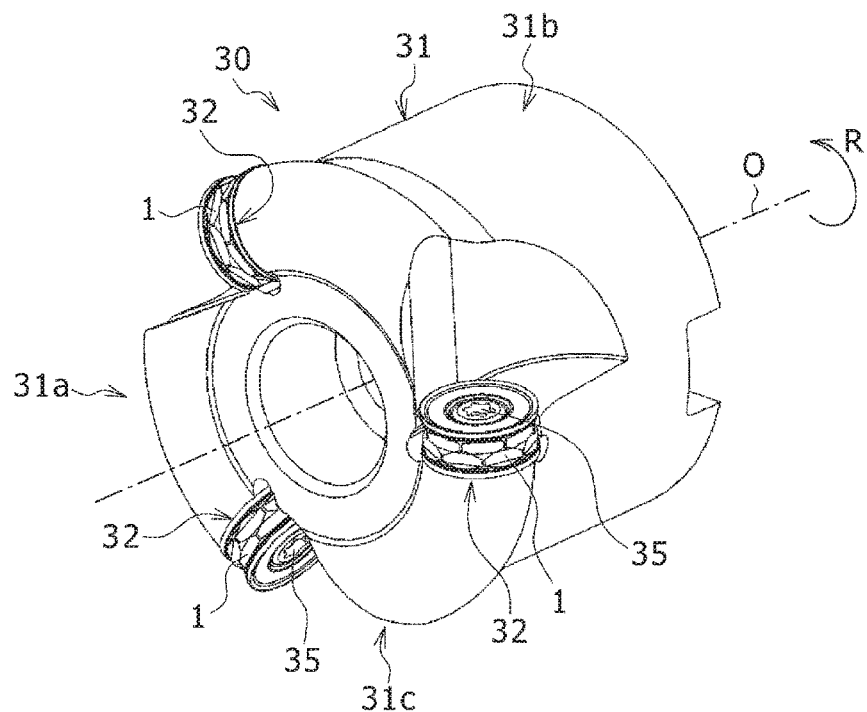
FIG. 11 is a perspective view showing an embodiment of an indexable rotary cutting tool of the present invention.

FIG. 11 is a perspective view showing an example of an indexable rotary cutting tool 30 according to the present embodiment to which the circular cutting inserts 1 of the first embodiment are attached. The indexable rotary cutting tool 30 is configured of the tool main body 31. The tool main body 31 includes a plurality of insert mounting seats 32 which are formed with a predetermined interval therebetween along an outer peripheral portion 31c of a tip portion 31a thereof. The insert mounting seats 32 each have the same shape as each other and are provided at equal intervals in the circumferential direction of the tool main body 31 so as to be rotationally symmetrical about a rotational axis O. FIG. 11 shows an example in which three insert mounting seats 32 are provided at intervals of 120 degrees about the rotational axis O of the tool main body 31. In addition, each of the insert mounting seats 32 is provided in a region which is formed by notching the tip portion 31a having an approximately doughnut shape about the rotational axis O to form a surface which is approximately parallel in the radial direction and the axial direction with respect to the tool main body 31 from a tip in the axial direction and faces the rotation direction of the tool main body 31 and a surface which is approximately perpendicular to the surface. The circular cutting insert 1 is attached to each insert mounting seat 32, and the cutting insert 1 is firmly fixed to the insert mounting seat 32 by tightening the clamp screw 35. A rear end portion 31b of the tool main body 31 is a portion for joining with an arbor member attached to a main spindle of a machine tool for performing the cutting operation. A reference numeral "R" shown in FIG. 11 indicates a direction in which the tool main body 31 rotates about the rotational axis O when the cutting operation is performed on a workpiece. Here, a direction from the rear end portion 31b of the tool main body 31 toward the tip portion 31a along the axial direction is referred to a tip side in the axial direction, and a direction opposite thereto is referred to as a rear end side in the axial direction. In addition, in the radial direction of the tool main body 31, a direction approaching the rotational axis O is referred to as an inside of the tool main body 31 in the radial direction, and a direction separated from the rotational axis O is referred to as an outside of the tool main body 31 in the radial direction. Moreover, in the circumferential direction of the tool main body 31, a direction R in which the tool main body 31 rotates is referred to as a rotational direction R, and a direction opposite thereto is referred to as an opposite side of the rotational direction R.

Figure 12:
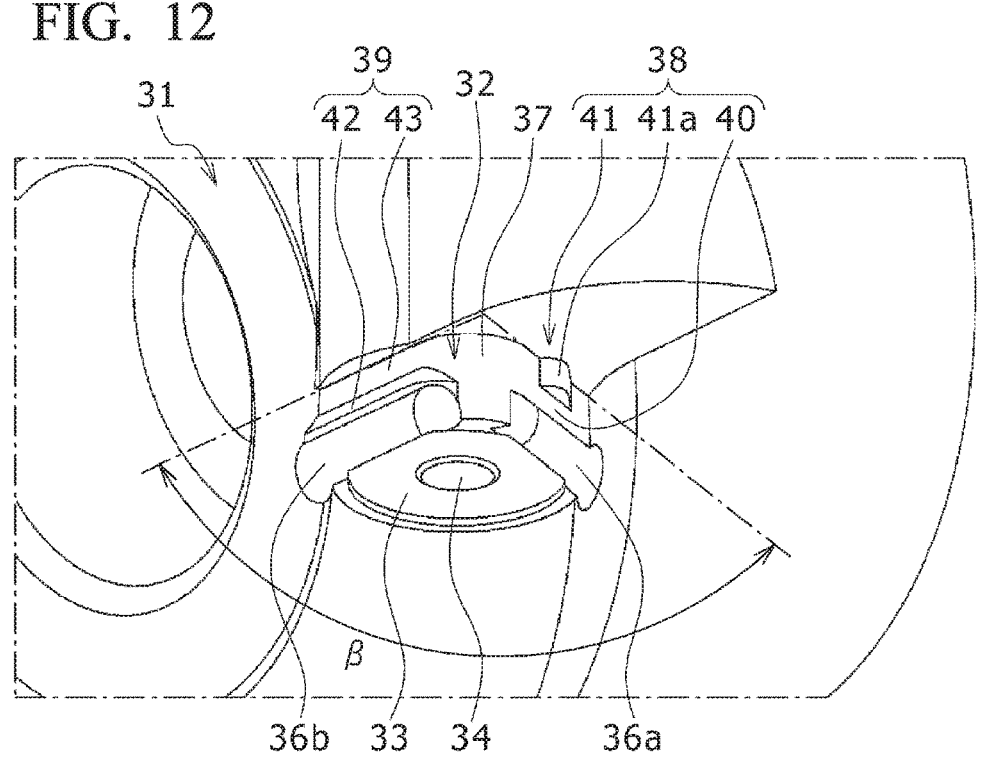
FIG. 12 is a perspective view showing a configuration of an insert mounting seat in the indexable rotary cutting tool shown in FIG. 11.

FIG. 12 is a perspective view of the insert mounting seat 32 for explaining a configuration of one of the plurality of insert mounting seats 32 provided on the tool main body 31 and shows a state before the circular cutting insert 1 is attached to the insert mounting seat 32.

As shown in FIG. 12, the insert mounting seat 32 includes: a seating surface 33; and a restraining wall (restraining wall surface) on which a first restraining wall 38 and a second restraining wall 39 are formed. The seating surface 33 is a surface facing the rotational direction R of the tool main body 31 and is a seating surface for seating the top surface flat portion 8a or the bottom surface flat portion 8b of the circular cutting insert 1 when the circular cutting insert 1 is attached to the insert mounting seat 32. The seating surface 33 is a plane which extends so as to be approximately parallel to the tool main body 31 in the axial direction and the radial direction. A screw hole 34 is perforated at circular cutting insert 1 when the circular cutting insert 1 is attached to the insert mounting seat 32 and is fixed by tightening the clamp screw 35. In other words, the screw hole 34 is a hole in which a female screw corresponding to a male screw of the clamp screw 35 is formed on an inner peripheral surface of the hole, and the screw hole 34 is screwed together with the male screw of the clamp screw 35 inserted into the screw insertion hole 5 when the circular cutting insert 1 is fixed.

The first restraining wall 38 is arranged in a direction substantially perpendicular to the seating surface 33 through a groove portion 36a, and the second restraining wall 39 is arranged in a direction substantially perpendicular to the seating surface 33 through a groove portion 36b. The first restraining wall 38 faces the tip side of the tool main body 31 in the axial direction. The second restraining wall 39 faces the outside of the tool main body 31 in the radial direction. A reference numeral "37" shown in FIG. 12 is a relief portion which connects the first restraining wall 38 and the second restraining wall 39 to each other. Each of the groove portions 36a and 36b is a groove having an approximately cylindrical inner peripheral surface which extends along the seating surface 33. The groove portion 36a is positioned on the rear end side of the tool main body 31 in the axial direction from the seating surface 33. The groove portion 36b is positioned on the inside of the tool main body 31 in the radial direction from the seating surface 33. In the rotation direction R of the tool main body 31, groove bottoms of the groove portions 36a and 36b, that is, the surfaces facing the rotational direction R are positioned on the opposite side of the rotational direction R from the seating surface 33. A groove wall of the groove portion 36a, that is, a surface thereof facing the tip side in the axial direction is positioned on the rear side from a planar restraining wall surface 40 described later of the first restraining wall 38 in the axial direction of the tool main body 31. A groove wall of the groove portion 36b, that is, a surface thereof facing the outside in the radial direction is positioned on the inside from a second restraining wall 39 described later in the radial direction of the tool main body 31.

The first restraining wall 38 and the second restraining wall 39 are restraining wall surfaces for exerting two or more functions among a function (indexing function) for restraining the circular cutting insert 1 at a predetermined position of the insert mounting seat 32, a function (antirotation function) preventing the rotation (or turning) of the circular cutting insert 1 during a cutting operation of a workpiece, and a function (antivibration function) for preventing or suppressing vibrations generated during a cutting operation of a workpiece, with respect to the circular cutting insert 1, when the circular cutting insert 1 is attached to the insert mounting seat 32 and is fixed by tightening the clamp screw 35 and after the circular cutting insert 1 is fixed. As shown in FIG. 12, the first restraining wall 38 and the second restraining wall 39 are formed so as to intersect with each other at an angle ($\beta$). More specifically, extended planes of the first restraining wall 38 and the second restraining wall 39 intersect with each other at the angle ($\beta$), and an inner end of the first restraining wall 38 in the radial direction and a rear end of the second restraining wall 39 in the axial direction are smoothly connected to each other through a recessed cylindrical surface-shaped relief portion 37. Hereinafter, configurations and functions of the first restraining wall 38 and the second restraining wall 39 will be described.

Figure 16:
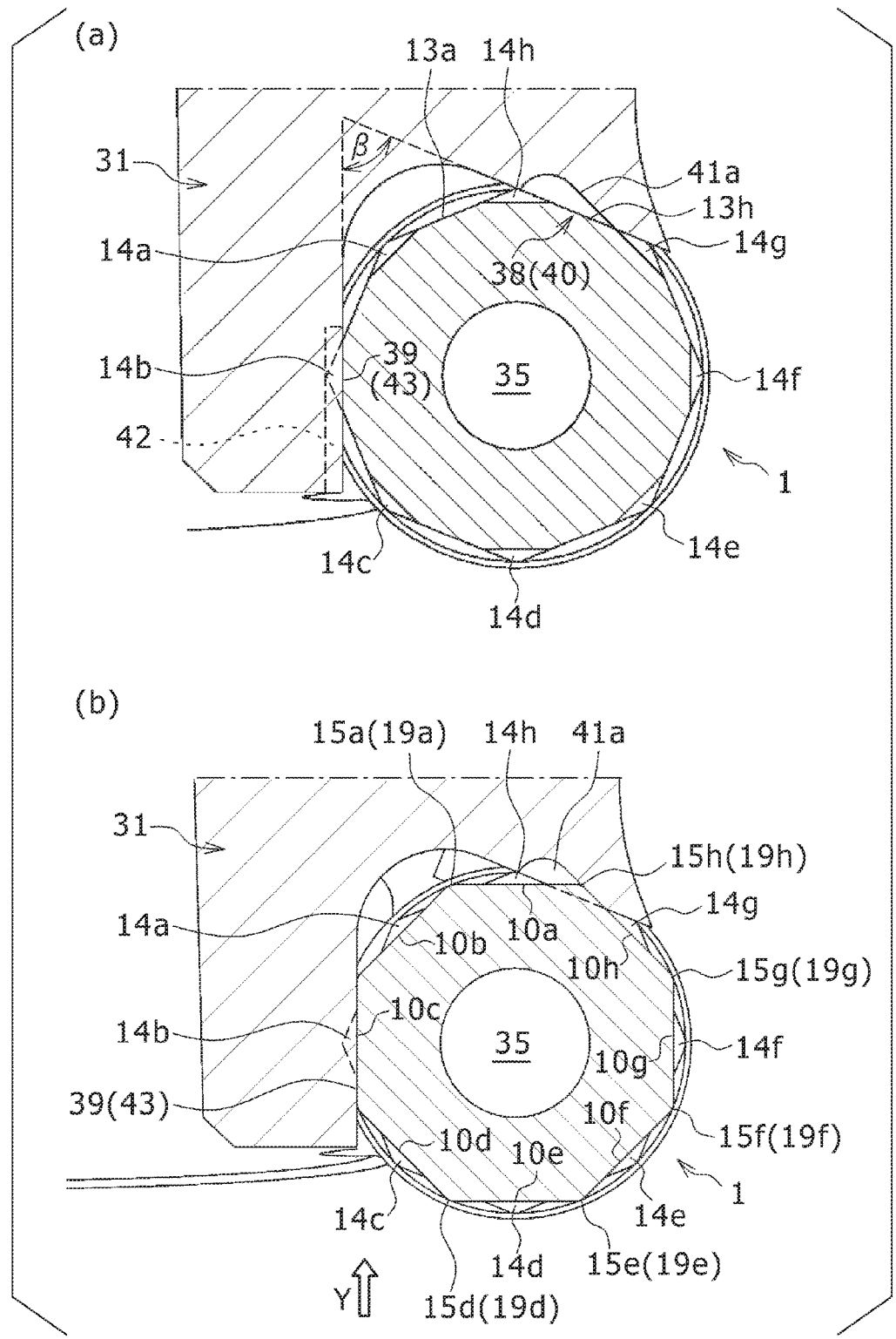
FIG. 16 is a sectional view of the indexable rotary cutting tool of FIG. 11 showing the state where the circular cutting insert according to the embodiment of the present invention is attached to the insert mounting seat, FIG. 16(*a*) is a view when the cross-section of the circular cutting insert taken along the intermediate plane (M) is viewed from the top surface, and FIG. 16(*b*) is a view when the cross-section taken along line A-A shown in FIG. 4 is viewed from the top surface.

As shown in FIG. 12, the first restraining wall 38 erects on the seating surface 33 through the groove portion 36a provided on the outer peripheral portion 31c side of the tool main body 31, and the planar restraining wall surface 40 and an antirotation wall surface 41 are formed on the surface of the first restraining wall 38 facing the seating surface 33 (facing the tip side in the axial direction). The planar restraining wall surface 40 is formed as a wall surface perpendicular to the seating surface 33 formed into a plane. The antirotation wall surface 41 is formed as an approximately V-shaped recessed portion 41a having a predetermined depth. In other words, the recessed portion 41a is formed by notching the planar restraining wall surface 40 into a columnar shape having an approximately triangular bottom surface which is separated from the seating surface 33 in the rotational direction R of the tool main body 31 and is approximately parallel to the seating surface 33 and a side surface which extends in a direction perpendicular to the seating surface 33. The side surface of the recessed portion 41a includes: a planar portion which is connected to the planar restraining wall surface 40 to form an obtuse angle; and a curved surface portion which is smoothly connected to the planar portion in the inside of the tool main body 31 in the radial direction (FIG. 16). In addition, in the formation positions of the planar restraining wall surface 40 and the antirotation wall surface 41 with respect to the seating surface 33, the planar restraining wall surface 40 are formed to be positioned below the antirotation wall surface 41. That is, the planar restraining wall surface 40 and the antirotation wall surface 41 are formed (disposed) to provide a stage respect to the seating surface 33. In other words, in a direction perpendicular to the seating surface 33, the antirotation wall surface 41 is positioned to be further separated from the seating surface 33 than the planar restraining wall surface 40 (the antirotation wall surface 41 is disposed at a more distant position than the planar restraining wall surface 40).

In the first restraining wall 38, the planar restraining wall surface 40 of the planar restraining wall surface 40 and the antirotation wall surface 41 formed to provide a stage with respect to the seating surface 33 is a wall surface for restraining any one of the planar restraining faces 13a, 13b, . . . , and 13h provided on the lower side surface 4b of the circular cutting insert 1 when the circular cutting insert 1 is attached and fixed to the insert mounting seat 32. In other words, when the circular cutting insert 1 is fixed to the insert mounting seat 32, the planar restraining wall surface 40 comes into surface contact with one of the planar restraining faces 13a, 13b, . . . , and 13h of the lower side surface 4b of the circular cutting insert 1. Accordingly, the cutting insert 1 is positioned in the direction facing the planar restraining wall surface 40.

Meanwhile, the V-shaped recessed portion 41a formed on the antirotation wall surface 41 is a wall surface for engaging with any one of the corners (corner portions) 15a, 15b, . . . , and 15h of the upper side surface 4a of the circular cutting insert 1, that is, any one of the antirotation surface 19a, 19b, . . . , and 19h so as to restrain it. In other words, when the circular cutting insert 1 is fixed to the insert mounting seat 32, the side surface of the recessed portion 41a comes into contact with any one of the antirotation surfaces 19a, 19b, . . . , and 19h of the upper side surface 4a of the circular cutting insert 1. Accordingly, as will be described later, it is possible to prevent the cutting insert 1 from rotating around the clamp screw 35 during the cutting operation.

In this way, the first restraining wall 38 is a restraining wall for simultaneously restraining any one of the planar restraining faces 13a, 13b, 13c, . . . , and 13h of the circular cutting insert I and any one of the antirotation surfaces 19a, 19b, . . . , and 19h thereof. That is, the first restraining wall 38 mainly has the indexing function and the antirotation function. Accordingly, the formation positions of the planar restraining wall surface 40 and the antirotation wall surface 41 of the first restraining wall 38 formed to provide the stage with respect to the seating surface 33 are required to be determined in advance in consideration of a state where the circular cutting insert 1 is seated on and fixed to the seating surface 33. Specifically, preferably, in a direction perpendicular to the seating surface 33, a distance between a boundary between the antirotation wall surface 41 and the planar restraining wall surface 40, that is, the bottom surface of the recessed portion 41a and the seating surface 33 is set to be equal to or more than a distance from the top surface 2 of the cutting insert 1 to the apex portion (t1) of each of the antivibration restraining faces 11a, . . . , and 11h of the upper side surface 4a and is set to be less than a distance from the top surface 2 to the apex portion (t2) of each of the antivibration restraining faces 14a, . . . , and 14h of the lower side surface 4b. More preferably, the distance between the bottom surface of the recessed portion 41a and the seating surface 33 is set to a distance from the top surface 2 of the cutting insert 1 to the intermediate plane (M).

The second restraining wall 39 includes the antivibration wall surface 42 and a planar restraining wall surface 43 formed to provide a stage with respect to the seating surface 33. Specifically, the planar restraining wall surface 43 is a wall surface perpendicular to the seating surface 33 and is a plane extending along the groove portion 36b. The angle β is formed between the planar restraining wall surface 43 and the planar restraining wall surface 40 of the first restraining wall 38. The antivibration wall surface 42 forms an obtuse angle between the planar restraining wall surface 43 and the antivibration wall surface 42 and extends between the planar restraining wall surface 43 and the groove portion 36b. In addition, the antivibration wall surface 42 is inclined to the inside of the tool main body 31 in the radial direction from one end of the planar restraining wall surface 43 toward the groove portion 36b. Moreover, a ridgeline which is a boundary between the antivibration wall surface 42 and the planar restraining wall surface 43 is parallel to the seating surface 33. In the present embodiment, the antivibration wall surface 42 is a plane.

The antivibration wall surface 42 is a wall surface for restraining any one of the antivibration restraining faces 14a, 14b, 14c, . . . , and 14h provided on the lower side surface 4b of the circular cutting insert 1. The antivibration wall surface 42 is formed to have an inclined face so as to come into contact (surface contact) with the inclined face of the antivibration restraining face of the circular cutting insert 1 when the circular cutting insert 1 is attached to the insert mounting seat 32. Accordingly, as will be described later, it is possible to prevent vibrations of the cutting insert 1 during the cutting operation.

Meanwhile, the planar restraining wall surface 43 is a wall surface for restraining any one of the planar restraining faces 10a, 10b, 10c, . . . , and 10h provided on the upper side surface 4a of the circular cutting insert 1, that is, the planar restraining face corresponding to (facing) the position of the antivibration restraining face provided on the lower side surface 4b of the circular cutting insert 1 coming into contact with (restraining) the antivibration wall surface 42. In other words, the planar restraining wall surface 43 comes into surface contact with any one of the planar restraining faces 10*a*, 10*b*, . . . , and 10*h* of the upper side surface 4*a* of the circular cutting insert 1 when the circular cutting insert 1 is fixed to the insert mounting seat 32. Accordingly, the circular cutting insert 1 is positioned in the direction facing the planar restraining wall surface 43. In this way, the second restraining wall 39 mainly has the antivibration function and the indexing function.

Therefore, the formation positions of the antivibration wall surface 42 and the planar restraining wall surface 43 of the second restraining wall 39 formed to provide the stage with respect to the seating surface 33 are required to be determined in advance in consideration of the state where the circular cutting insert 1 is seated on and fixed to the seating surface 33. Specifically, in the direction perpendicular to the seating surface 33, preferably, a distance between a boundary between the antivibration wall surface 42 and the planar restraining wall surface 43 and the seating surface 33 is set to be the same as the distance from the top surface 2 (bottom surface 3) of the cutting insert 1 to the intermediate plane (M).

In addition, the above-described intersecting angle ($\beta$) at which the first restraining wall 38 and the second restraining wall 39 intersect with each other is set to 67.5 degrees (90 degrees−(360 degrees/(2×8 corners))) in a case where the (eight-corner type) circular cutting insert 1 of an embodiment in which the eight planar restraining faces and the eight antivibration restraining faces are disposed in each of the upper side surface 4*a* and the lower side surface 4*b* is attached to the insert mounting seat 32. In addition, in a case where a six-corner type circular cutting insert (the circular cutting insert in which six planar restraining faces and six antivibration restraining faces are provided in each of the upper side surface 4*a* and the lower side surface 4*b*) is attached, the intersecting angle ($\beta$) is set to 60 degrees (90 degrees−(360 degrees/(2×6 corners))). In this way, in the present embodiment, the angle $\beta$ is set according to the angle formed between two planar restraining faces each abutting on the planar restraining wall surfaces 40 and 43 in a case where the circular cutting insert 1 is attached to the insert mounting seat 32. Moreover, as will be described later, preferably, the angle $\beta$ is set to an acute angle.

Figure 13:
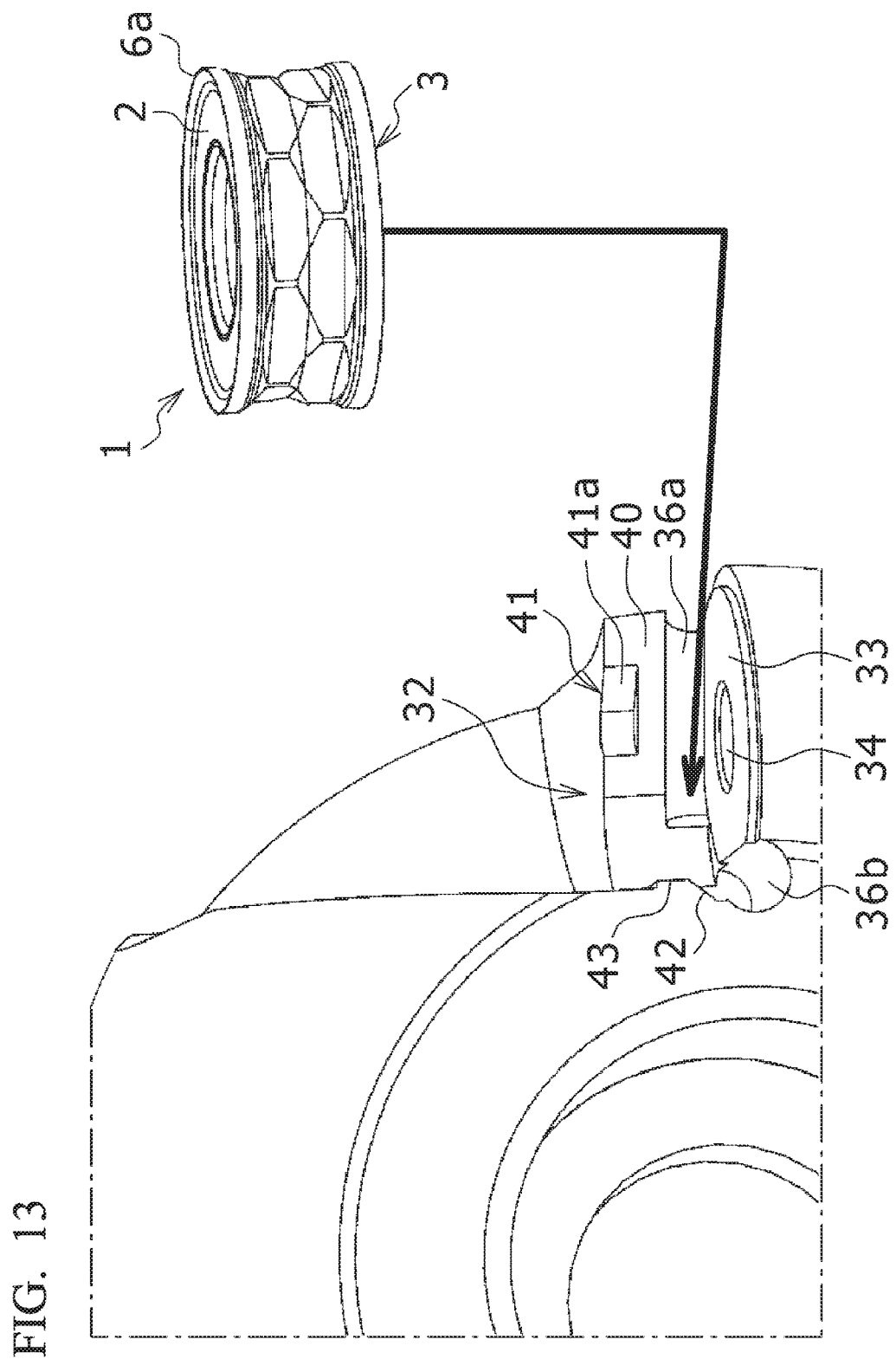
FIG. 13 is a partial front view when a tool main body is viewed from a tip portion to explain the configuration of the insert mounting seat in the indexable rotary cutting tool shown in FIG. 11.

Any one of the bottom surface flat portion 8*b* of the bottom surface 3 or the top surface flat portion 8*a* of the top surface 2 of the circular cutting insert 1 shown in FIG. 13 is seated on the seating surface 33 of the insert mounting seat 32 shown FIG. 12, and the circular cutting insert 1 can be detachably attached and fixed to the insert mounting seat 32 by tightening the clamp screw 35.

For example, in the operation of attaching and fixing the circular cutting insert 1 to the insert mounting seat 32, in a case where an unused cutting edge 6*a* of the top surface 2 is used for the cutting operation, as shown by a thick line arrow in FIG. 13, the bottom surface 3 (bottom surface flat portion 8*b*) of the cutting insert 1 is attached to the seating surface 33 while moving in a transverse direction (a direction parallel to the seating surface) to be parallel to the seating surface 33 from a front side of the seating surface 33 (the outside of the tool main body 31 in the radial direction), and thus, any one of the antirotation surfaces 19*a*, 19*b*, . . . , and 19*h* provided on the upper side surface 4*a* of the circular cutting insert 1 engages with the recessed portion 41*a* of the antirotation wall surface 41. In other words, in the two planar restraining faces 10*a*, 10*b*, . . . , and 10*h* configuring any one of the antirotation surfaces 19*a*, 19*b*, . . . , and 19*h* (corner portions 15*a*, 15*b*, . . . , and 15*h*), the planar restraining face facing the direction in which the clamp screw 35 rotates when the cutting insert 1 is fixed, abuts on the planar portion on the side surface of the recessed portion 41*a*. Preferably, the surfaces come into surface contact with each other. According to this operation, the planar restraining faces disposed on the lower side surface 4*b* side of the circular cutting insert 1 facing the antirotation surface engaging with the recessed portion 41*a* of antirotation wall surface 41 come into contact with the planar restraining wall surface 40 of the first restraining wall 38. In other words, the planar restraining faces of the lower side surface 4*b* disposed at the same position as that of the antirotation surface in the circumferential direction of the circular cutting insert 1 come into surface contact with the planar restraining wall surface 40.

Figure 14:
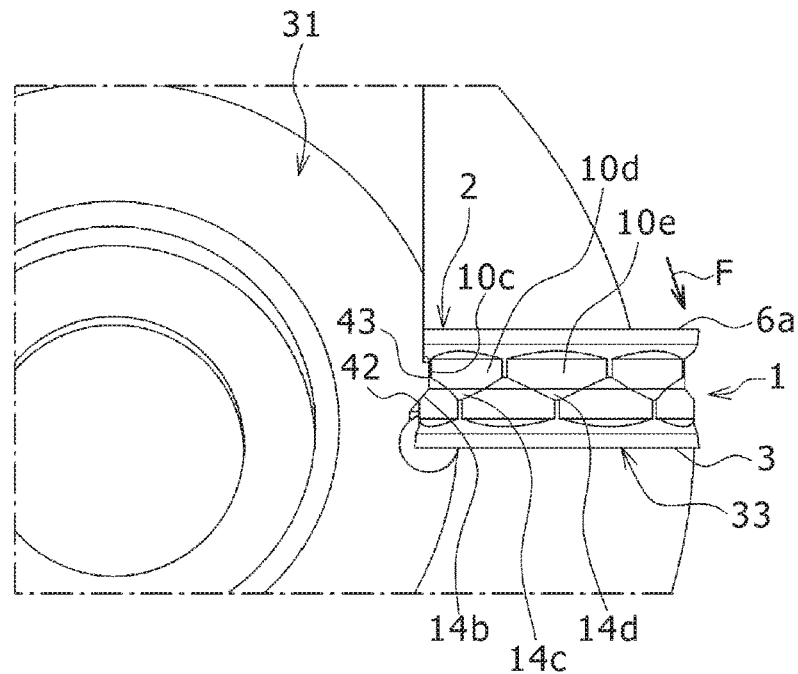
FIG. 14 is a partial front view showing a state when the circular cutting insert according to the embodiment of the present invention is attached to the insert mounting seat shown in FIG. 13.

FIG. 14 shows the state when the circular cutting insert 1 is attached and fixed to the insert mounting seat 32 and is a view when the tip portion 31*a* of the tool main body 31 is viewed from the front side (the tip side in the axial direction). An arrow F shown in FIG. 14 indicates a cutting force acting on the top surface 2 of the circular cutting insert 1 when the cutting operation is performed using the cutting edge 6*a* provided on the top surface 2 of the circular cutting insert 1.

Figure 15:
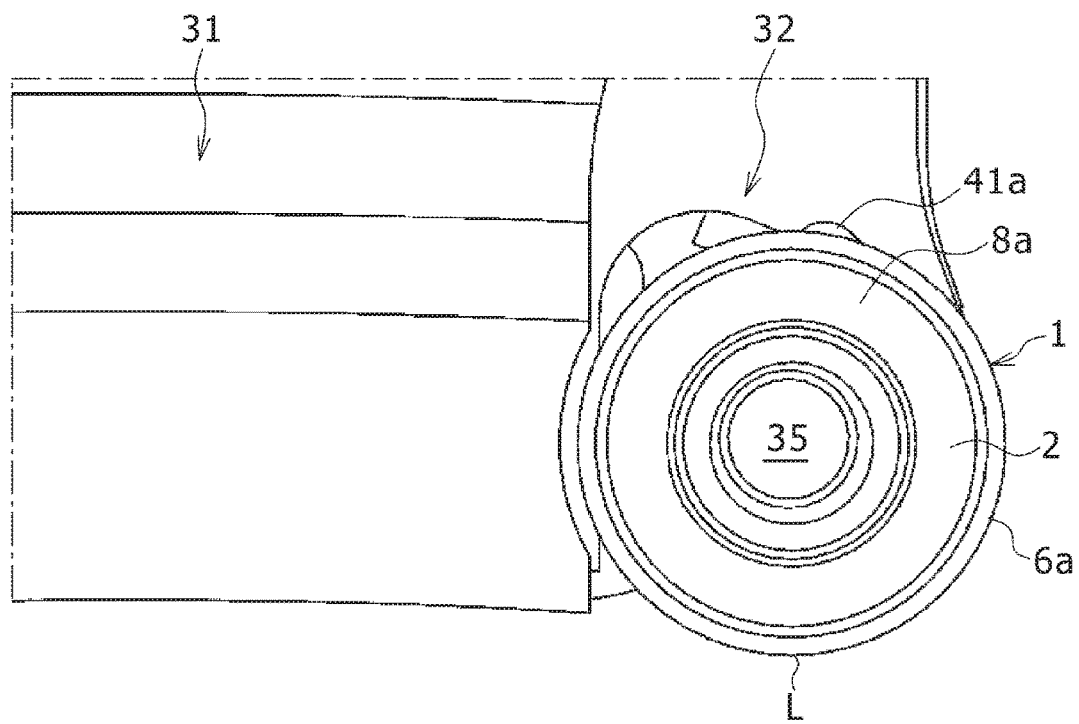
FIG. 15 is a partial front view showing a state where the tool main body and the circular cutting insert are viewed from the top surface of the attached circular cutting insert when the circular cutting insert according to the embodiment of the present invention is attached to the insert mounting seat.

FIG. 15 is a view when the tool main body 31 is viewed from the top surface 2 of the circular cutting insert 1 (from the opposite side of the rotation direction R) in the case where the circular cutting insert 1 is attached and fixed to the insert mounting seat 32 in FIG. 14. A reference numeral "L" shown in FIG. 15 indicates the lowest point of the indexable rotary cutting tool 30 in the direction of the rotational axis O. In general, in a case where a cutting operation of a workpiece is performed by the indexable rotary cutting tool 30 to which the circular cutting insert 1 is attached, in the cutting edge 6*a* formed into a circular shape, a cutting edge positioned within a range from the lowest point L to 45 degrees in the direction toward the outer peripheral portion 31*c* of the tool main body 31 (toward the outside of the tool main body 31 in the radial direction) about the central axis P of the screw insertion hole 5 is used.

(Restraining Structure of Insert Mounting Seat for Restraining Circular Cutting Insert)

Next, when the circular cutting insert 1 is attached to the insert mounting seat 32 of the tool main body 31 and is fixed by tightening the clamp screw 35, a restraining structure (restraining relationship) of the insert mounting seat 32 of the tool main body 31 for restraining the circular cutting insert 1 will be described. The "restraining" means that the first restraining wall 38 and the second restraining wall 39 provided on the insert mounting seat 32 of the tool main body 31 restrain an appropriate portion (come into contact with an appropriate portion) of the side surface 4 of the circular cutting insert 1 (or the circular cutting insert 25) such that the indexable rotary cutting tool 30 to which the circular cutting insert 1 of the first embodiment (or the circular cutting insert 25 of the second embodiment) is attached exerts the above-described "indexing function", "antirotation function", and "antivibration function".

FIG. 16 is a sectional view showing a state where the circular cutting insert 1 of the first embodiment is attached (fixed) to the insert mounting seat 32 of the indexable rotary cutting tool 30 shown in FIG. 12, FIG. 16(*a*) is a view when the cross-sections of the tool main body 31 and the circular cutting insert 1 taken along the intermediate plane (M) of the circular cutting insert 1 are viewed from the top surface 2 side, and FIG. 16(*b*) is a view when the cross-sections of the tool main body 31 and the circular cutting insert 1 taken along line A-A shown in FIG. 4 are viewed from the top surface 2 side. In FIGS. 16(a) and 16(b), for simplification of explanation, the joint portions 12a and 12b are not shown. The "β" shown in FIG. 16(a) is the angle (β) shown in FIG. 12 and indicates the angle (β) at which the first restraining wall 38 and the second restraining wall 39 intersect with each other.

Moreover, FIG. 16 is a view for explaining the restraining structure for the insert mounting seat 32, which is the characteristic of the present embodiment, to restrain the circular cutting insert 1 when the circular cutting insert 1 is attached and fixed to the insert mounting seat 32. Hereinafter, this restraining structure will be described with reference to FIG. 16.

(Restraining Structure of First Restraining Wall 38 for Restraining Circular Cutting Insert)

The restraining structure of the first restraining wall 38 for restraining the side surface 4 of the circular cutting insert 1 includes the following first restraining structure and second restraining structure.

(First Restraining Structure)

The first restraining structure is a structure in which the corner portions 15a, . . . , and 15h (16a, . . . , and 16h) (antirotation surfaces 19a, . . . , and 19h (20a, . . . , and 20h)) of the circular cutting insert 1 and the antirotation wall surface 41 (the approximately V-shaped recessed portion 41a) of the insert mounting seat 32 engage with each other. As shown in FIG. 16(b), the corner (corner portion) 15h which is the antirotation surface 19h of the upper side surface 4a of the circular cutting insert 1 engages with the approximately V-shaped recessed portion 41a of the antirotation wall surface 41 provided on the first restraining wall 38. FIG. 16(b) shows the first restraining structure in which the corner 15h (antirotation surface 19h) which is one of the corners provided on the upper side surface 4a of the circular cutting insert 1 is fitted into and engages with the recessed portion 41a. In other words, in the first restraining structure, the corner portion 15h is inserted into the recessed portion 41a, and a portion of the planar restraining face 10h configuring the corner portion 15h (antirotation surface 19h) comes into surface contact with the planar portion on the side surface of the recessed portion 41a.

Moreover, as shown in FIG. 16(b), in this engagement relationship, when the circular cutting insert 1 is fixed to the insert mounting seat 32 by tightening the clamp screw 35 in a right-handed rotation (clockwise direction in FIG. 16(b)), in the V-shaped recessed portion 41a, a right wall surface on the paper surface of FIG. 16(b) (the planar portion on the side surface of the recessed portion 41a) comes into contact with and engages with one planar portion of the corner 15h (planar restraining face 10h). In addition, as shown in FIG. 14, in the cutting force F acting on the circular cutting insert 1 during the cutting operation of the workpiece, a component force of the cutting force F acts on the circular cutting insert 1 shown in FIG. 16(b) in the clockwise direction. Accordingly, the engagement relationship (first restraining structure) between the approximately V-shaped recessed portion 41a of the antirotation wall surface 41 and the corner 15h (antirotation surface 19h) of the circular cutting insert 1 exerts the above-described antirotation function of preventing the rotation of the circular cutting insert 1 during the cutting operation.

(Second Restraining Structure)

The second restraining structure is a structure in which the planar restraining face 13a, . . . , and 13h (10a, . . . , and 10h) of the circular cutting insert 1 and the planar restraining wall surface 40 of the insert mounting seat 32 engage with each other. FIG. 16(a) shows a restraining structure in which the planar restraining wall surface 40 provided on the first restraining wall 38 of the insert mounting seat 32 engages with the planar restraining face 13h among the planar restraining faces 13a, 13b, 13c, . . . , and 13h provided on the lower side surface 4b of the circular cutting insert 1 in planes. In other words, in the second restraining structure, the planar restraining face 13h comes into surface contact with the planar restraining wall surface 40. This restraining structure exerts a function (indexing function) for positioning the circular cutting insert 1 at an accurate position of the insert mounting seat 32 without errors in cooperation with a third restraining structure described later.

In this way, the planar restraining wall surface 40 and the recessed portion 41a of the antirotation wall surface 41 formed into a V shape to provide a stage on the first restraining wall 38 each restrain one of the planar restraining faces 13a, . . . , and 13h of the lower side surface 4b of the circular cutting insert 1 and one of the antirotation surfaces 19a, . . . , and 19h of the upper side surface 4a disposed so as to face the planar restraining faces in the thickness direction. More specifically, the planar restraining wall surface 40 and the planar portion of the recessed portion 41a provided on the first restraining wall 38 intersect with each other at a predetermined angle. Accordingly, a rotation suppression force acting on one of the antirotation surfaces 19a, . . . , and 19h of the upper side surface 4a and a restraining force acting on one of the planar restraining faces 13a, . . . , and 13h of the lower side surface 4b act in a direction against a turning force generated around the central axis P of the screw insertion hole 5 of the cutting insert 1. In addition to this, the rotation suppression force and the restraining force effectively prevent rotational fine motions or vibrations in the clockwise direction and the counter-clockwise direction generated around the central axis P during the cutting operation, in cooperation with the third restraining structure described later. In addition, the rotation suppression force and the restraining force also exert the indexing function for preventing an erroneous attachment of the circular cutting insert 1.

(Restraining Structure of Second Restraining Wall 39 for Restraining Circular Cutting Insert)

The restraining structure of the second restraining wall 39 for restraining the side surface 4 of the circular cutting insert 1 includes the following third restraining structure and fourth restraining structure.

(Third Restraining Structure)

The third restraining structure is a structure in which the planar restraining faces 10a, . . . , and 10h (13a, . . . , and 13h) of the circular cutting insert 1 and the planar restraining wall surface 43 provided on the second restraining wall 39 of the insert mounting seat 32 engage with each other. FIG. 16(b) shows a restraining structure in which the planar restraining wall surface 43 of the second restraining wall 39 shown in FIG. 16(b) engages with one planar restraining face 10c among the planar restraining faces 10a, 10b, 10c, . . . , and 10h of the upper side surface 4a of the circular cutting insert 1. In other words, in the third restraining structure, the planar restraining face 10c comes into surface contact with the planar restraining wall surface 43. The third restraining structure contributes to highly exert the indexing function for positioning the circular cutting insert 1 at an accurate position of the insert mounting seat 32 without erroneous operations when the circular cutting insert 1 is attached to the insert mounting seat 32, in cooperation with the second restraining structure in which the planar restraining wall surface 40 of the first restraining wall 38 of the second restraining structure engages with the planar restraining face 13h provided on the lower side surface 4b of the circular cutting insert 1 in planes.

The reason why the indexable rotary cutting tool of the present embodiment can highly exert the above-described indexing function is in the following (1) and (2).

(1) One of the planar restraining faces 13a, . . . , and 13h provided on the lower side surface 4b of the circular cutting insert 1 is restrained by the planar restraining wall surface 40 of the first restraining wall 38, one of the planar restraining faces 10a, . . . , and 10h provided on the upper side surface 4a of the circular cutting insert 1 is restrained by the planar restraining wall surface 43 of the second restraining wall 39, and the planar restraining wall surface 40 of the first restraining wall 38 and the planar restraining wall surface 43 of the second restraining wall 39 are formed so as to face (intersect with) each other at the intersecting angle β (the angle which is the same as the angle formed between one of the planar restraining faces 13a, . . . , and 13h on which the planar restraining wall surface 40 abuts and one of the planar restraining faces 10a, . . . , and 10h to which the planar restraining wall surface 43 abuts) which is an acute angle. Accordingly, when the clamp screw 35 is loosened and an operation for reattaching the circular cutting insert 1 is performed or when an operation for attaching a new cutting insert 1 is performed, it is possible to position the circular cutting insert 1 at an accurate position of the insert mounting seat 32 without erroneous attachment.

(2) When the circular cutting insert 1 is attached to the insert mounting seat 32, it is necessary to cause one of the antirotation surfaces 19a, . . . , and 19h (20a, . . . , and 20h) of the circular cutting insert 1 to be fitted to (to engage with) the V-shaped recessed portion 41a of the antirotation wall surface 41 provided on the first restraining wall 38 of the insert mounting seat 32. Accordingly, it is possible to reliably prevent the circular cutting insert 1 from being erroneously attached to the insert mounting seat 32.

(Fourth Restraining Structure)

The fourth restraining structure is an engagement structure generated by the contact between the antivibration restraining faces 11a, . . . , and 11h (14a, . . . , and 14h) of the circular cutting insert 1 and the antivibration wall surface 42 provided on the second restraining wall 39 of the insert mounting seat 32. In the second restraining wall 39 of the insert mounting seat 32 shown in FIG. 16(a), the portion indicated by the reference numeral 14b is one of the antivibration restraining faces 14a, 14b, . . . , and 14h provided on the lower side surface 4b of the circular cutting insert 1. FIG. 16(a) shows that the antivibration restraining face 14b comes into contact with and engages with the antivibration wall surface 42 of the second restraining wall 39. The antivibration wall surface 42 is an inclined face which comes into engagement contact with (comes into surface contact with) the inclined face of each of the inclined antivibration restraining faces 14a, 14b, . . . , and 14h of the circular cutting insert 1, and thus is not shown in FIG. 16(a). Accordingly, in FIG. 16(a), a region formed by the antivibration wall surface 42 is shown by a dotted line.

In FIG. 14 (FIG. 13) showing the state where the circular cutting insert 1 is viewed in an arrow Y direction shown in FIG. 16(b), it is shown that the antivibration wall surface 42 of the second restraining wall 39 is formed as an inclined face inclined in a direction separated from the screw hole 34. In other words, the antivibration wall surface 42 is a surface which extends to be inclined in the rotation direction R from the inside of the tool main body 31 in the radial direction toward the outside thereof. In addition, FIG. 14 in which the circular cutting insert 1 is attached shows the state where the antivibration restraining face 14b provided on the lower side surface 4b of the circular cutting insert 1 comes into engagement contact (comes into surface contact) with the antivibration wall surface 42 of the second restraining wall 39. The fourth restraining structure exerts a function (antivibration function) for preventing or suppressing occurrence of vibrations during the cutting operation of the workpiece in the present embodiment.

In addition, as shown in FIG. 12, the antivibration wall surface 42 of the second restraining wall 39 is formed along the inclined face as the lower end portion of the planar restraining wall 43 and the length of the formed antivibration wall surface 42 is approximately the same as the length of the planar restraining wall surface 43. Accordingly, when the circular cutting insert 1 is attached to the insert mounting seat 32 as shown in FIG. 13, an attachment operation of the circular cutting insert 1 is easily performed, and erroneous operations at the time of the attachment can be prevented.

In the above-described fourth restraining structure, the reason why the contact and engagement between the antivibration wall surface 42 of the second restraining wall 39 and the antivibration restraining face 14h provided on the lower side surface 4b of the circular cutting insert 1 exert the function for preventing or suppressing the occurrence of vibrations is as follows.

In the indexable rotary cutting tool 30 to which the circular cutting insert 1 is attached, it is considered that in the cutting force acting on the cutting edge 6a (6b), a component force in a circumferential tangential direction in a rotation trajectory of the cutting edge 6a (6b) of the cutting tool 30 largely contributes to the occurrence of the vibrations of the cutting insert 1. Accordingly, in the antivibration function of the above-described indexable rotary cutting tool 30 of the present embodiment, the antivibration restraining faces 11a, 11b, . . . , and 11h and the antivibration restraining faces 14a, 14b, . . . , and 14h are provided on the upper side surface 4a and the lower side surface 4b of the double-sided circular cutting insert 1 such that a portion except for the clamp screw 35 can receive a repulsive force with respect to the component force in the circumferential tangential direction in the rotation trajectory. In addition, when the circular cutting insert 1 is attached to the insert mounting seat 32, the inclined face of the antivibration restraining face of the circular cutting insert 1 comes into contact with the antivibration wall surface 42 (refer to FIG. 14).

In addition, when the cutting operation of the workpiece is performed in a state where the inclined face of one antivibration restraining face of the circular cutting insert 1 comes into contact with the antivibration wall surface 42, if vibrations are generated by a cutting force, the vibrations exerts an operation of pressing the antivibration restraining face on the circular cutting insert 1 side to the antivibration wall surface 42. The operation of pressing is caused by the component force of the cutting force in the circumferential tangential direction in the rotation trajectory of the cutting edge 6a (6b) of the cutting tool. The antivibration restraining face and the antivibration wall surface 42 come into surface contact with each other, and with respect to this pressing force, the antivibration wall surface 42 of the insert mounting seat 32 receives the component force of the cutting force in the circumferential tangential direction. Accordingly, the antivibration wall surface 42 come into strong engagement-contact with the antivibration restraining face of the circular cutting insert 1 and exerts effects of preventing or suppressing of occurrence of the vibrations while maintaining the restraining force.

In addition, as described above, the antivibration wall surface 42 has the surface inclined to come into engagement contact with (come into surface contact with) the inclined face of the antivibration restraining face of the circular cutting insert I, and thus it is possible to increase an area receiving the component force of the cutting force in the circumferential tangential direction in the rotation trajectory of the cutting edge 6a (6b) of the cutting tool 30. Accordingly, it is possible to further increase effects for preventing the occurrence of the vibrations during the cutting operation. In addition, the antivibration wall surface 42 restrains the antivibration restraining face formed at the position separated from the screw insertion hole 5 on the side surface (the sides of the upper side surface 4a and the lower side surface 4b which do not have the cutting edge used for the cutting operation) of the circular cutting insert 1 at the position away from the cutting edge used during the cutting operation (within the range of 45 degrees from the lowest point L of the cutting edge 6a shown in FIG. 15 toward the outer peripheral portion 31c of the tool main body 31 (toward the outside of the tool main body 31 in the radial direction), and thus, it is possible to increase the effect of preventing the occurrence of vibrations.

The above-described first to fourth restraining structures can be also provided in the indexable rotary cutting tool 30 to which the circular cutting insert 25 of the second embodiment is attached, and thus, descriptions thereof are omitted.

(Structure of Inclined Face of Antivibration Restraining Face)

FIG. 7 shows the example in which the inclined faces of the antivibration restraining faces of the circular cutting insert 1 are each formed into a flat surface shape. However, the inclined faces adopt a structure shown in FIG. 17.

As shown by dotted line circles in FIG. 17(*a*), FIG. 17(*a*) shows an example in which in the longitudinal section which passes through the central axis P of the screw insertion hole 5 of the cutting insert 1 and intersects with the antivibration restraining faces 14d and 14h, the shapes of the cross-sections of the antivibration restraining faces 14d and 14h are formed into gentle convex lines, and FIG. 17(*b*) shows an example in which the shapes of the cross-sections of the antivibration restraining faces 14d and 14h are formed into gentle concave lines. In this way, compared to the case where the shapes of the cross-sections of the restraining faces are formed into a flat surface shapes shown in FIG. 7, in the case where the shape of the cross-sections of the surfaces of all the antivibration restraining faces 11a, 11b, . . . , and 11h and all the antivibration restraining faces 14a, 14b, . . . , and 14h, including the antivibration restraining faces 14d and 14h, are formed into gentle convex lines or gentle concave lines, it is possible to surface areas of the antivibration restraining faces. Accordingly, the force receiving the component force of the cutting force increases, and thus, effects for preventing the occurrence of vibrations increase.

The shapes of the cross-sections of the above-described antivibration restraining faces 11a to 11h and 14a to 14h can be also applied to the circular cutting insert 25 of the second embodiment.

In addition, as shown in FIG. 17(*a*), in the case where the shapes of the cross-sections of the antivibration restraining faces of the cutting insert 1 (25) are formed into gentle convex lines, the antivibration wall surface 42 of the insert mounting seat 32 is formed into a concave line corresponding to the convex line. As shown in FIG. 17(*b*), in the case where the shapes of the cross-sections of the antivibration restraining faces are formed into gentle concave lines, the antivibration wall surface 42 of the insert mounting seat 32 is formed into a convex line corresponding to the concave line. Therefore, the antivibration restraining face of the cutting insert 1 (25) and the antivibration wall surface 42 of the insert mounting seat 32 come into surface contact with each other when the cutting insert 1 (25) is fixed to the insert mounting seat 32, and thus, the above-described antivibration functions are exerted.

In the indexable rotary cutting tool 30 to which the above-described eight-corner type double-sided cutting insert 1 (25) is attached, for example, with respect to the cutting edge 6a provided on the top surface 2 of the cutting insert 1 (25), by repeating the reattachment of the cutting insert 1, the eight regions of the cutting edges 6a can be sequentially used in the cutting operation. In addition, after all the regions of the cutting edge 6a of the top surface 2 are used, in order to use the cutting edge 6b of the bottom surface 3 of the cutting insert 1 (25), the top surface 2 and the bottom surface 3 are inverted to be reattached to the insert mounting seat 32, and thus, an unused cutting edge 6b of the bottom surface 3 can be used in the cutting operation. Therefore, in one cutting insert 1, total 16 cutting edge regions can be used in the cutting operation.

Accordingly, in a case where all the cutting edge regions of the cutting edge 6a on the top surface 2 of the above-described double-sided cutting insert 1 (25) are used and the top surface 2 and then the bottom surface 3 are inverted to be reattached to the insert mounting seat 32 in order to use the cutting edge 6b of the bottom surface 3 of the cutting insert 1 (25), in the "top surface 2" and the "bottom surface 3" in the descriptions of the above-described embodiments, it is obvious that the surface having the cutting edge used in the cutting operation indicates the top surface 2.

In the indexable rotary cutting tool 30 according to the embodiments of the present invention, the positional relationship between the first restraining wall 38 and the second restraining wall 39 shown in FIG. 12 may be reversed to the right and left, that is, the second restraining wall 39 may be formed and disposed on the right side on the paper surface of FIG. 12, and the first restraining wall 38 may be formed and disposed on the left side on the paper surface of FIG. 12.

(Manufacturing Method of Circular Cutting Insert and Tool Main Body)

Next, outlines of manufacturing methods of the circular cutting insert 1 (25) according to the embodiments of the present invention and the tool main body 31 to which the cutting insert 1 is attached, will be described.

It is desirable that a material of the circular cutting insert 1 of the embodiment is a hard material such as WC (tungsten carbide)-Co (cobalt) base cemented carbide which is widely adopted in the related art. In a case where the circular cutting insert 1 is made of cemented carbide, the outline of the manufacturing method of the circular cutting insert 1 is as follows.

(1) A pressed molded body of the circular cutting insert 1 is produced by pressurization-molding (press-molding) cemented carbide powder in which Co powder and a binder are added to WC powder using a powder molding apparatus using a mold (molding step). The side surface 4 of the circular cutting insert 1 has a complicated configuration, and thus, it is necessary to mold the pressed molded body formed by powder molding such that density of the cemented carbide powder becomes uniform. Accordingly, it is desirable to use as the powder molding apparatus used in the press molding, a powder molding apparatus having multi-axial specifications such as three axes or four axes.

(2) Subsequently, by firing the press molded body at a temperature of 1300 to 1450° C. for a predetermined time in a sintering furnace, a circular cutting insert made of a sintered body having a high hardness can be obtained (firing step). In the circular cutting insert manufactured through the firing step, finishing machine may be applied to a necessary portion of the circular cutting insert using a diamond grindstone or the like. In addition, the cutting insert 1 (25) of the present embodiment may be made of a hard material such as cermet or ceramics in addition to the above-described cemented carbide.

The tool main body 31 can be manufactured by cutting a round rod material made of alloy tool steel such as SKD 61 using an NC controlled processing machine. The insert mounting seat 32 can be formed by a cutting operation using an end mill or the like. In addition, desirably, the detailed shape of the insert mounting seat 32 is subjected to precise machining using a small-diameter end mill or the like.

Moreover, in the cutting insert 1 as the first embodiment of the above-described circular cutting insert of the present invention, the example is described in which each of the antivibration restraining faces $11a, 11b, \ldots,$ and $11h$ and the antivibration restraining faces $14a, 14b, \ldots,$ and $14h$ disposed on the side surface 4 is formed into an isosceles trapezoid when the circular cutting insert is viewed from the side surface. However, the antivibration restraining faces $11a, 11b, \ldots, 11h, 14a, 14b, \ldots,$ and $14h$ may be formed into an isosceles triangle when the circular cutting insert 1 (25) is viewed from the side surface as in the cutting insert 25 of the second embodiment. In this case, the center portion of each of the joint portions $12a$ and $12b$ having the minute width w closer to the side surface-intermediate line (N) is the vertex which is the apex of the isosceles triangle.

The indexable rotary cutting tool 30 according to the embodiment of the present invention is used in engraving machining or a cutting operation of a free curved surface on the surface of a rotary blade or the like in addition to general plane machining at high speed in a cutting operation of a workpiece, and the indexable rotary cutting tool 30 can improve surface accuracy on the machined surface of the workpiece and remarkably improve tool life.

The present invention is not limited to the above-described embodiments, the configurations (constituent elements) described in the above-described embodiments, a modification example, an explanatory note, or the like may be combined within a scope which does not depart from the gist of the present invention, and addition, omission, replacement, or other modification of the configurations are possible. Moreover, the present invention is not limited by the above-described embodiments and is limited only by the claims.

INDUSTRIAL APPLICABILITY

The double-sided circular cutting insert and the indexable rotary cutting tool of the present invention have a high indexing function, antirotation function, and antivibration function, and thus, according to the present invention, it is possible to improve the surface accuracy of a machined surface of a workpiece and remarkably improve tool life.

REFERENCE SIGNS LIST

1: circular cutting insert of first embodiment (double-sided circular cutting insert)
2: top surface
3: bottom surface
4: side surface
4a: upper side surface
4b: lower side surface
5: screw insertion hole
5a: inner diameter reduced portion
6a, 6b: cutting edge
7a, 7b: rake face
8a: top surface flat portion
8b: bottom surface flat portion
9a, 9b: flank face
$10a, 10b, 10c, \ldots, 10h$: planar restraining face of upper side surface 4a
$11a, 11b, 11c, \ldots, 11h$: antivibration restraining face of upper side surface 4a
12a: joint portion of upper side surface 4a
12b: joint portion of lower side surface 4b
$13a, 13b, 13c, \ldots, 13h$: planar restraining face of lower side surface 4b
$14a, 14b, 14c, \ldots, 14h$: antivibration restraining face of lower side surface 4b
$15a, 15b, 15c, \ldots, 15h$: corner (corner portion) of upper side surface 4a
$16a, 16b, 16c, \ldots, 16h$: corner (corner portion) of lower side surface 4b
$17a, 17b, 17c, \ldots, 17h$: inclined face of antivibration restraining face $11a, 11b, 11c, \ldots, 11h$
$18a, 18b, 18c, \ldots, 18h$: inclined face of antivibration restraining face $14a, 14b, 14c, \ldots, 14h$
$19a, 19b, 19c, \ldots, 19h$: antirotation surface of upper side surface 4a
$20a, 20b, 20c, \ldots, 20h$: antirotation surface of lower side surface 4b
21a, 21b: inclined face
25: circular cutting insert (double-sided circular cutting insert) of second embodiment
26a: joint ridgeline of upper side surface 4a
26b: joint ridgeline of lower side surface 4b
$27a, 27b, 27c, \ldots, 27h$: antivibration restraining face of upper side surface 4a
$28a, 28b, 28c, \ldots, 28h$: antivibration restraining face of lower side surface 4b
30: indexable rotary cutting tool
31: tool main body
31a: tip portion
31b: rear end portion
31c: outer peripheral portion
32: insert mounting seat
33: seating surface
34: screw hole
35: clamp screw
36a, 36b: groove portion
37: relief portion
38: first restraining wall
39: second restraining wall
40: planar restraining wall surface of first restraining wall 38
41: antirotation wall surface of first restraining wall 38
41a: approximately V-shaped recessed portion
42: antivibration wall surface of second restraining wall 39
43: planar restraining wall surface of second restraining wall 39
M: intermediate plane of circular cutting insert
N: side surface-intermediate line of circular cutting insert
O: rotational axis of indexable rotary cutting tool (tool main body)
P: central axis of screw insertion hole 5 a, b, c, d, e, f: each side of planar restraining face formed into a hexagonal shape g: lower base of antivibration restraining face which is disposed on upper side surface and formed into a trapezoidal shape or a triangular shape l: length of side f of planar restraining face m: length of side c of planar restraining face provided on side surface-intermediate line (N)

S: region functioning as antirotation surface t1: apex portion (upper base) of antivibration restraining face disposed on upper side surface 4a t2: apex portion (upper base) of antivibration restraining face disposed on lower side surface 4b t3: vertex of antivibration restraining face formed on upper side surface 4a t4: vertex of antivibration restraining face formed on lower side surface 4b α: shifting angle β: intersecting angle between first restraining wall and the second restraining wall

The invention claimed is:

1. A double-sided circular cutting insert comprising:
a top surface and a bottom surface configured to be detachably attached to an insert mounting seat and formed into a circular shape in a planar view of the circular cutting insert;
a side surface connecting the top surface and the bottom surface;
a screw insertion hole penetrating from the top surface to the bottom surface; and
cutting edges formed on intersecting ridgelines at which the top surface and the bottom surface intersect with the side surface, wherein
when a plane bisecting the circular cutting insert in a thickness direction is referred to as an intermediate plane (M) of the circular cutting insert, an imaginary ridgeline at which the intermediate plane (M) intersects with the side surface is referred to as a side surface-intermediate line (N), the side surface between the side surface-intermediate line (N) and the top surface is referred to as an upper side surface, and the side surface between the side surface-intermediate line (N) and the bottom surface is referred to as a lower side surface,
the upper side surface and the lower side surface each comprise:
a plurality of planar restraining faces disposed sequentially in a circumferential direction of the upper side surface and the lower side surface so as to interpose a joint portion between each of the planar restraining faces, each planar restraining face having a side disposed on the side surface-intermediate line (N), and
a plurality of antivibration restraining faces, each antivibration restraining face being disposed between two planar restraining faces adjacent through the joint portion, and comprising an inclined face which has an apex portion at an end portion of each of the joint portions closer to the side surface-intermediate line (N) and a side disposed on the side surface-intermediate line (N) and tilts from the apex portion to the side so as to have a length in the circumferential direction of the side surface gradually increasing from the apex portion to the side surface-intermediate line (N),
the planar restraining faces and the antivibration restraining faces of the lower side surface are disposed so as to be shifted with respect to the planar restraining faces and the antivibration restraining faces of the upper side surface by a predetermined angle (α) around a central axis of the screw insertion hole, and
the planar restraining faces and the antivibration restraining faces of the upper side surface and the lower side surface are each configured to be restrained by a restraining wall surface provided on the insert mounting seat when the circular cutting insert is attached to an indexable rotary cutting tool.

2. The double-sided circular cutting insert according to claim 1, wherein
the side of each of the planar restraining faces of the upper side surface disposed on the side surface-intermediate line (N) is also the side of each of the antivibration restraining faces of the lower side surface disposed on the side surface-intermediate line (N), and
the side of each of the planar restraining faces of the lower side surface disposed on the side surface-intermediate line (N) is also the side of each of the antivibration restraining faces of the upper side surface disposed on the side surface-intermediate line (N).

3. The double-sided circular cutting insert according to claim 1, wherein
the sides of the planar restraining faces disposed on the side surface-intermediate line (N) and the sides of the antivibration restraining faces disposed on the side surface-intermediate line (N) have the same length and are alternately connected with each other along the side surface-intermediate line (N).

4. The double-sided circular cutting insert according to claim 1, wherein
each of the joint portions has a predetermined width in the circumferential direction of the side surface, and
each of the antivibration restraining faces is formed into an isosceles trapezoid when the circular cutting insert is viewed from the side surface, and the isosceles trapezoid has an upper base which is the apex portion of each of the joint portions, and a lower base which is the side disposed on the side surface-intermediate line (N).

5. The double-sided circular cutting insert according to claim 1, wherein
each of the joint portions comprises a joint ridgeline which is a ridgeline formed by sides of two adjacent planar restraining faces which face each other, and
each of the antivibration restraining faces is formed into an isosceles triangle or an equilateral triangle when the circular cutting insert is viewed from the side surface, the isosceles triangle and the equilateral triangle have an apex which is an end of the joint ridgeline closer to the side surface-intermediate line (N), and a base corresponding to the apex which is the side disposed on the side surface-intermediate line (N).

6. The double-sided circular cutting insert according to claim 1, wherein
in a longitudinal section of the circular cutting insert passing through a central axis of the screw insertion hole, a ridgeline of each of the antivibration restraining faces is linear, convex, or concave.

7. The double-sided circular cutting insert according to claim 1, wherein
each of the joint portion and each of regions in the adjacent two planar restraining faces in a predetermined range from the joint portion in the circumferential direction of the side surface are formed into an antirotation surface as a corner portion, and
the antirotation surface is configured to be restrained by the restraining wall surface provided on the insert mounting seat as a means of preventing the circular cutting insert from rotation when the circular cutting insert is attached to an indexable rotary cutting tool.

8. The double-sided circular cutting insert according to claim 1, wherein
an outline of a cross-section of the circular cutting insert along the intermediate plane (M) is formed into a regular polygon.

9. The double-sided circular cutting insert according to claim 1, wherein
the upper side surface and the lower side surface each comprise: the eight planar restraining faces, the eight antivibration restraining faces, and the eight antirotation surfaces; and
the angle ($\alpha$) is set to be 22.5 degrees.

10. The double-sided circular cutting insert according to claim 1, wherein
the upper side surface and the lower side surface each comprise: the six planar restraining faces, the six antivibration restraining faces, and the six antirotation surfaces; and
the angle ($\alpha$) is set to be 30 degrees.

11. An indexable rotary cutting tool comprising:
a tool main body which comprises an insert mounting seat; and
the double-sided circular cutting insert according to claim 1 which is detachably attached to a seating surface provided on the insert mounting seat by tightening a clamp screw,
wherein the insert mounting seat comprises a restraining wall surface for restraining the side surface of the circular cutting insert, the restraining wall surface erecting on the seating surface, and
wherein the restraining wall surface comprises:
a first restraining wall provided with an antirotation wall surface configured to restrain one of the antirotation surfaces formed on the upper side surface of the circular cutting insert, and a planar restraining wall surface configured to restrain one of the planar restraining faces disposed on the lower side surface at a position corresponding to the restrained antirotation surface, and
a second restraining wall provided with a planar restraining wall surface configured to restrain one of the planar restraining faces formed on the upper side surface of the circular cutting insert, and an antivibration wall surface configured to restrain one of the antivibration restraining faces disposed on the lower side surface at a position corresponding to the restrained planar restraining face.

12. The indexable rotary cutting tool according to claim 11, wherein
the antirotation wall surface and the planar restraining wall surface of the first restraining wall are formed such that the antirotation wall surface is disposed at a more distant position from the seating surface than the planar restraining wall surface.

13. The indexable rotary cutting tool according to claim 11, wherein
the planar restraining wall surface and the antivibration wall surface of the second restraining wall are formed such that the antivibration wall surface is disposed at a closer position from the seating surface than the planar restraining wall surface.

14. The indexable rotary cutting tool according to claim 11, wherein
the antirotation wall surface comprises a wall surface formed into a concave shape and configured to engage with the antirotation surface of the circular cutting insert.

15. The indexable rotary cutting tool according to claim 11, wherein
the antivibration wall surface comprises a wall surface formed into a shape corresponding to the antivibration restraining face of the circular cutting insert and configured to contact with the antivibration restraining face.

16. The indexable rotary cutting tool according to claim 11, wherein
the double-sided circular cutting insert of which the upper side surface and the lower side surface each comprise the eight planar restraining faces, the eight antivibration restraining faces, and the eight antirotation surfaces is attached to the insert mounting seat, and
the first restraining wall and the second restraining wall are formed so as to intersect with each other at an intersecting angle of 67.5 degrees.

17. The indexable rotary cutting tool according to claim 11, wherein
the double-sided circular cutting insert of which the upper side surface and the lower side surface each comprise the six planar restraining faces, the six antivibration restraining faces, and the six antirotation surfaces is attached to the insert mounting seat, and
the first restraining wall and the second restraining wall are formed so as to intersect with each other at an intersecting angle of 60 degrees.

18. A double-sided circular cutting insert comprising:
a top surface and a bottom surface configured to be detachably attached to an insert mounting seat and formed into a circular shape in a planar view of the circular cutting insert;
a side surface connecting the top surface and the bottom surface;
a screw insertion hole penetrating from the top surface to the bottom surface; and
cutting edges formed on intersecting ridgelines at which the top surface and the bottom surface intersect with the side surface, wherein
when a plane bisecting the circular cutting insert in a thickness direction is referred to as an intermediate plane (M) of the circular cutting insert, an imaginary ridgeline at which the intermediate plane (M) intersects with the side surface is referred to as a side surface-intermediate line (N), the side surface between the side surface-intermediate line (N) and the top surface is referred to as an upper side surface, and the side surface between the side surface-intermediate line (N) and the bottom surface is referred to as a lower side surface,
the upper side surface and the lower side surface each comprise:
a plurality of planar restraining faces disposed sequentially in a circumferential direction of the upper side surface and the lower side surface so as to interpose a joint portion between each of the planar restraining faces, each planar restraining face having a side disposed on the side surface-intermediate line (N), and
a plurality of antivibration restraining faces, each antivibration restraining face being disposed between two planar restraining faces adjacent through the joint portion, and comprising an inclined face which has an apex portion at an end portion of each of the joint portions closer to the side surface-intermediate line (N) and a side disposed on the side surface-intermediate line (N) and tilts from the apex portion to the side so as to have a length in the circumferential direction of the side surface gradually increasing from the apex portion to the side surface-intermediate line (N), and the planar restraining faces and the antivibration restraining faces of the lower side surface are disposed so as to be shifted with respect to the planar restraining faces and the antivibration restraining faces of the upper side surface by a predetermined angle ($\alpha$) around a central axis of the screw insertion hole.

* * * * *